US012687794B2

(12) United States Patent
Nishi et al.

(10) Patent No.: US 12,687,794 B2

(45) Date of Patent: Jul. 21, 2026

(54) ELECTROPHOTOGRAPHIC PHOTOSENSITIVE MEMBER, PROCESS CARTRIDGE, ELECTROPHOTOGRAPHIC APPARATUS, AND METHOD OF PRODUCING ELECTROPHOTOGRAPHIC PHOTOSENSITIVE MEMBER

(71) Applicant: CANON KABUSHIKI KAISHA, Tokyo (JP)

(72) Inventors: Masashi Nishi, Kanagawa (JP); Akihiro Maruyama, Shizuoka (JP); Michiyo Sekiya, Shizuoka (JP); Nanami Kato, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 572 days.

(21) Appl. No.: 18/332,404

(22) Filed: Jun. 9, 2023

(65) Prior Publication Data

US 2023/0408938 A1 Dec. 21, 2023

(30) Foreign Application Priority Data

Jun. 15, 2022 (JP) ................................ 2022-096646

(51) Int. Cl.
*G03G 5/07* (2006.01)

(52) U.S. Cl.
CPC .................................. *G03G 5/076* (2013.01)

(58) Field of Classification Search
CPC ...... G03G 5/076; G03G 5/142; G03G 5/0648; G03G 5/065; G03G 5/0657
See application file for complete search history.

(56) References Cited

U.S. PATENT DOCUMENTS

| | | | | |
|---|---|---|---|---|
| 9,477,163 | B2 | 10/2016 | Nishi | |
| 10,656,542 | B2 | 5/2020 | Nishi | |
| 2014/0154620 | A1 * | 6/2014 | Ito | G03G 5/047 430/58.05 |
| 2016/0377998 | A1 | 12/2016 | Sekido | |
| 2019/0317415 | A1 | 10/2019 | Iwasaki | |

FOREIGN PATENT DOCUMENTS

| | | | |
|---|---|---|---|
| EP | 2738612 | A1 | 6/2014 |
| JP | 2014215477 | A | 11/2014 |
| JP | 2017203821 | A | 11/2017 |

OTHER PUBLICATIONS

Yamashita, S., et al., "Handbook of Crosslinking Agents", Taiseisha Ltd, 1981.

* cited by examiner

*Primary Examiner* — Peter L Vajda

(74) *Attorney, Agent, or Firm* — Canon U.S.A., Inc. I.P. Division

(57) ABSTRACT

An electrophotographic photosensitive member that shows stable sensitivity even when repeatedly used. The electrophotographic photosensitive member is an electrophotographic photosensitive member including a support, an undercoat layer, a charge generating layer, and a charge transporting layer in the stated order, wherein the undercoat layer contains two kinds of electron transporting substances.

6 Claims, 2 Drawing Sheets

ELECTROPHOTOGRAPHIC PHOTOSENSITIVE MEMBER, PROCESS CARTRIDGE, ELECTROPHOTOGRAPHIC APPARATUS, AND METHOD OF PRODUCING ELECTROPHOTOGRAPHIC PHOTOSENSITIVE MEMBER

BACKGROUND OF THE INVENTION

Field of the Invention

The present disclosure relates to an electrophotographic photosensitive member, a process cartridge, an electrophotographic apparatus, and a method of producing an electrophotographic photosensitive member.

Description of the Related Art

An electrophotographic photosensitive member containing an organic photoelectroconductive substance (organic electrophotographic photosensitive member, hereinafter also referred to as “photosensitive member”) has currently been in the mainstream of an electrophotographic photosensitive member to be mounted on a process cartridge or an electrophotographic apparatus. The electrophotographic photosensitive member using the organic photoelectroconductive substance has such advantages as described below: the photosensitive member is pollution-free and has high productivity, and a material therefor is easy to design.

The electrophotographic photosensitive member generally includes a support and a photosensitive layer formed on the support. In addition, a laminate type photosensitive layer, which is obtained by laminating a charge generating layer and a charge transporting layer in the stated order from a support side, has been generally used as the photosensitive layer. Further, an intermediate layer is often arranged between the support and the photosensitive layer for the purpose of suppressing the injection of charge from the support side to a photosensitive layer side to suppress the occurrence of an image defect such as a black dot. In addition, an electroconductive layer or an undercoat layer may be arranged between the support and the intermediate layer.

In recent years, a charge generating substance has been improved in sensitivity, and hence the use of such substance increases the quantity of charge to be generated. Along with the increase, there has occurred a problem in that the generated charge is liable to remain in the charge generating layer.

A technology including incorporating an electron transporting substance into the intermediate layer to smooth electron transfer from a charge generating layer side to the support side has been known as a technology for the suppression of such remaining of the charge in the charge generating layer.

However, along with an increase in speed of an electrophotographic process and the lengthening of the lifetime of a cartridge, performance that the photosensitive member is required to have has become more and more sophisticated, and hence the electron transfer may not be sufficient even when such technology is used. Accordingly, technological development for the improvement of the intermediate layer has been performed.

In Japanese Patent Application Laid-Open No. 2014-215477, there is a disclosure of a technology including incorporating an electron transporting substance having a specific structure into an intermediate layer. In addition, in Japanese Patent Application Laid-Open No. 2017-203821, there is a disclosure of a technology including incorporating specific particles into an intermediate layer.

A photosensitive member, which can stably output an image even when repeatedly used for a long time period, has been required.

According to an investigation made by the inventors, each of the technologies disclosed in Japanese Patent Application Laid-Open No. 2014-215477 and Japanese Patent Application Laid-Open No. 2017-203821 has still been susceptible to improvement in terms of electrical characteristics at the time of long-term repeated use.

SUMMARY OF THE INVENTION

An aspect of the present disclosure is to provide an electrophotographic photosensitive member, which shows stable electrical characteristics even when repeatedly used for a long time period, and a process cartridge and an electrophotographic apparatus each including the electrophotographic photosensitive member.

According to the present disclosure, there is provided an electrophotographic photosensitive member including: a support; an undercoat layer formed on the support; and a photosensitive layer formed on the undercoat layer, wherein the undercoat layer comprises a polymer of a composition comprising a compound represented by the following formula (1), a compound represented by the following formula (2), and a crosslinking agent having a group capable of being bonded to one of a hydroxy group or a carboxyl group, or contains at least a compound represented by the following formula (3) and a compound represented by the following formula (4):

(1)

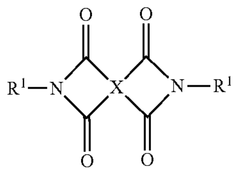

(2)

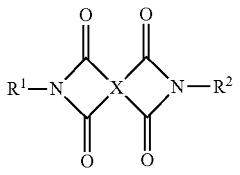

(3)

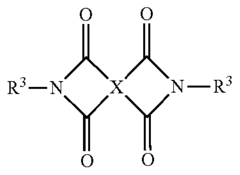

(4)

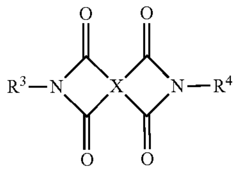

in the formulae (1) and (2), $R^1$ and $R^2$ are not identical to each other, and are each represented by the following formula (10):

(10)

$$—(R^a)_m—(R^b)_n—R^c$$

in the formula (10), $R^a$ represents a branched or linear alkylene group having 1 or more and 10 or less carbon atoms that optionally has a substituent, or a phenylene group that optionally has a substituent, and $R^b$ represents —O—, —S—, or a group represented by the following formula (11):

(11)

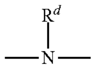

in the formula (11), $R^d$ represents a hydrogen atom, or a branched or linear alkyl group having 1 or more and 4 or less carbon atoms, and $R^c$ represents a hydrogen atom, a branched or linear alkyl group having 1 or more and 10 or less carbon atoms that optionally has a substituent, an aryl group having 6 or more and 14 or less carbon atoms that optionally has a substituent, or a branched or linear arylalkyl group having 7 or more and 18 or less carbon atoms that optionally has a substituent, in a case that the alkylene group or the alkyl group has a substituent, the substituent is a hydroxy group, a carboxyl group, an amino group, a thiol group, an alkoxy group having 1 or more and 3 or less carbon atoms, or an alkoxycarbonyl group having 2 or more and 4 or less carbon atoms, in a case that the phenylene group, the aryl group, or the arylalkyl group has a substituent, the substituent is an alkyl group having 1 or more and 3 or less carbon atoms, a hydroxy group, a hydroxyalkyl group having 1 or more and 3 or less carbon atoms, a carboxyl group, an amino group, a thiol group, an alkoxy group having 1 or more and 3 or less carbon atoms, an alkoxycarbonyl group having 2 or more and 4 or less carbon atoms, a halogen atom, a cyano group, or a nitro group, m represents 0 or 1, and n represents 0 or 1, and at least one selected from the group consisting of $R^1$ and $R^2$ contains a hydroxy group or a carboxyl group, in the formulae (3) and (4), $R^3$ and $R^4$ are not identical to each other, and are each represented by the following formula (10):

(10)

$$—(R^a)_m—(R^b)_n—R^c$$

in the formula (10), $R^a$ represents a branched or linear alkylene group having 1 or more and 10 or less carbon atoms that optionally has a substituent, or a phenylene group that optionally has a substituent, and $R^b$ represents —O—, —S—, or a group represented by the following formula (11):

(11)

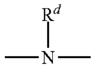

in the formula (11), $R^d$ represents a hydrogen atom, or a branched or linear alkyl group having 1 or more and 4 or less carbon atoms, and $R^c$ represents a hydrogen atom, a branched or linear alkyl group having 1 or more and 10 or less carbon atoms that optionally has a substituent, an aryl group having 6 or more and 14 or less carbon atoms that optionally has a substituent, or a branched or linear arylalkyl group having 7 or more and 18 or less carbon atoms that optionally has a substituent, in a case that the alkylene group or the alkyl group has a substituent, the substituent is a hydroxy group, a carboxyl group, an amino group, a thiol group, an alkoxy group having 1 or more and 3 or less carbon atoms, or an alkoxycarbonyl group having 2 or more and 4 or less carbon atoms, in a case that the phenylene group, the aryl group, or the arylalkyl group has a substituent, the substituent is an alkyl group having 1 or more and 3 or less carbon atoms, a hydroxy group, a hydroxyalkyl group having 1 or more and 3 or less carbon atoms, a carboxyl group, an amino group, a thiol group, an alkoxy group having 1 or more and 3 or less carbon atoms, an alkoxycarbonyl group having 2 or more and 4 or less carbon atoms, a halogen atom, a cyano group, or a nitro group, m represents 0 or 1, and "n" represents 0 or 1, and in the formulae (1), (2), (3), and (4), X represents any structure selected from tetravalent structures represented by the formula (X1), the formula (X2), and the formula (X3):

(X1)

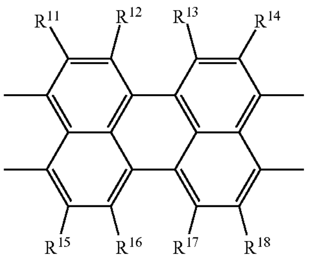

(X2)

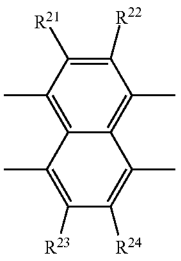

(X3)

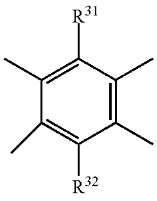

in the formulae (X1), (X2), and (X3), $R^{11}$ to $R^{32}$ each independently represent a hydrogen atom, a halogen atom, a cyano group, or a nitro group.

The present disclosure also relates to a process cartridge including: the above-mentioned electrophotographic photosensitive member; and at least one unit selected from the group consisting of: a charging unit; a developing unit; a transferring unit; and a cleaning unit, the process cartridge integrally supporting the electrophotographic photosensitive member and the at least one unit, and being detachably attachable to a main body of an electrophotographic apparatus.

The present disclosure also relates to an electrophotographic apparatus including: the above-mentioned electrophotographic photosensitive member; a charging unit; an exposing unit; a developing unit; and a transferring unit.

The present disclosure also relates to a method of producing an electrophotographic photosensitive member comprising a support, an undercoat layer formed on the support, and a photosensitive layer formed on the undercoat layer, the method comprising: forming a coating film of a coating liquid for an undercoat layer comprising a compound represented by the formula (1), a compound represented by the formula (2), and a crosslinking agent having a group capable of being bonded to one of a hydroxy group or a carboxyl group; and polymerizing the coating film to form the undercoat layer.

Further features of the present disclosure will become apparent from the following description of exemplary embodiments with reference to the attached drawings.

DESCRIPTION OF THE EMBODIMENTS

In the present disclosure, the undercoat layer of an electrophotographic photosensitive member is a polymer of a composition containing at least: a compound represented by the formula (1); a compound represented by the formula (2); and a crosslinking agent having a group capable of being bonded to a hydroxy group or a carboxyl group. Alternatively, in the present disclosure, the undercoat layer contains at least a compound represented by the formula (3) and a compound represented by the formula (4).

The inventors have assumed the reason why when the undercoat layer adopts the above-mentioned configuration, the charging potential of the electrophotographic photosensitive member is stable even at the time of long-term repeated use thereof to be as described below.

In the undercoat layer, an electron is transferred through an electron transporting substance, and hence molecules of the same kind identical to each other in electron cloud spreading (electron distribution state) may be advantageous for the electron transfer because of overlap between their electron clouds. However, when the electron transfer is repeatedly performed by long-term use of the electrophotographic photosensitive member, the electron transporting substance that has received the electron may form a molecular composite with any other electron transporting substance. The molecular composite has an energy level different from that of the electron transporting substance alone, and hence serves as an inhibiting factor (trap site) for the electron transfer to cause the electron to remain in the layer. Thus, the deterioration of the sensitivity of the photosensitive member may be caused.

In view of the foregoing, the inventors have made studies to find that an increase in charging potential of the electrophotographic photosensitive member can be suppressed by using, in the undercoat layer, the polymer of the composition containing electron transporting substances represented by the formula (1) and the formula (2), or the mixture of electron transporting substances represented by the formula (3) and the formula (4). The inventors have conceived the reason for the foregoing as follows: the incorporation of two electron transfer substances having similar structures can suppress the formation of a molecular composite while maintaining overlap between the electron clouds of their molecules to some extent.

[Electrophotographic Photosensitive Member]

Figure 2:
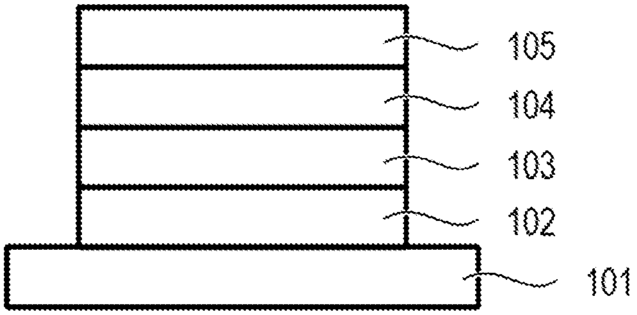
FIG. 2 is a view for illustrating an example of the layer configuration of the electrophotographic photosensitive member.

The electrophotographic photosensitive member includes: a support; the undercoat layer formed on the support; and a photosensitive layer formed on the undercoat layer. FIG. 2 is a view for illustrating an example of the layer configuration of the electrophotographic photosensitive member. In FIG. 2, the electrophotographic photosensitive member includes a support 101, and an electroconductive layer 102 is formed on the support 101, an undercoat layer 103 is formed on the electroconductive layer 102, a charge generating layer 104 is formed on the undercoat layer 103, and a charge transporting layer 105 is formed on the charge generating layer 104. That is, the electrophotographic photosensitive member includes the support 101, the electroconductive layer 102, the undercoat layer 103, the charge generating layer 104, and the charge transporting layer 105 in the stated order. Although a cylindrical electrophotographic photosensitive member has been widely used as a general electrophotographic photosensitive member, a shape, such as a belt shape or a sheet shape, may also be adopted in addition to the cylindrical shape.

<Support>

The support preferably has conductivity (electroconductive support). For example, a support made of a metal, such as aluminum, nickel, copper, gold, or iron, or an alloy thereof may be used. In addition, a support obtained by forming a thin film of an electroconductive material, such as a metal or a metal oxide, on an insulating support may be used as the electroconductive support. Such support is, for example, a support obtained by forming a thin film of a metal, such as aluminum, silver, or gold, on an insulating support made of, for example, a polyester resin, a polycarbonate resin, a polyimide resin, or glass, or a support obtained by forming a thin film of an electroconductive material, such as indium oxide or tin oxide, thereon. The surface of the support may be subjected to electrochemical treatment such as anodization, or to wet homing treatment, blast treatment, or cutting treatment for improving its electrical characteristics or suppressing interference fringes.

<Electroconductive Layer>

The electroconductive layer may be arranged on the support. The arrangement of the electroconductive layer can conceal flaws and unevenness in the surface of the support, and control the reflection of light on the surface of the support.

The electroconductive layer preferably contains electroconductive particles and a resin.

A material for the electroconductive particles is, for example, a metal oxide, a metal, or carbon black.

Examples of the metal oxide include zinc oxide, aluminum oxide, indium oxide, silicon oxide, zirconium oxide, tin oxide, titanium oxide, magnesium oxide, antimony oxide, and bismuth oxide. Examples of the metal include aluminum, nickel, iron, nichrome, copper, zinc, and silver.

Of those, the metal oxide is preferably used as the electroconductive particles, and in particular, titanium oxide, tin oxide, and zinc oxide are more preferably used.

When the metal oxide is used as the electroconductive particles, the surface of the metal oxide may be treated with a silane coupling agent or the like, or the metal oxide may be doped with an element, such as phosphorus or aluminum, or an oxide thereof.

In addition, the electroconductive particles may each be of a laminated configuration having a core particle and a coating layer coating the particle. Examples of the core particle include titanium oxide, barium sulfate, and zinc oxide. The coating layer is, for example, a metal oxide such as tin oxide.

In addition, when the metal oxide is used as the electroconductive particles, their volume-average particle diameter is preferably 1 nm or more and 500 nm or less, more preferably 3 nm or more and 400 nm or less.

Examples of the resin include a polyester resin, a polycarbonate resin, a polyvinyl acetal resin, an acrylic resin, a silicone resin, an epoxy resin, a melamine resin, a polyurethane resin, a phenol resin, and an alkyd resin.

In addition, the electroconductive layer may further contain, for example, a silicone oil, resin particles, or a concealing agent such as titanium oxide.

The average thickness of the electroconductive layer is preferably 1 μm or more and 50 μm or less, particularly preferably 3 μm or more and 40 μm or less.

The electroconductive layer may be formed by preparing a coating liquid for a electroconductive layer containing the above-mentioned materials and a solvent, forming a coating film thereof, and drying the coating film. Examples of the solvent to be used for the coating liquid include an alcohol-based solvent, a sulfoxide-based solvent, a ketone-based solvent, an ether-based solvent, an ester-based solvent, and an aromatic hydrocarbon-based solvent. A dispersion method for dispersing the electroconductive particles in the coating liquid for a electroconductive layer is, for example, a method including using a paint shaker, a sand mill, a ball mill, or a liquid collision type high-speed disperser.

<Undercoat Layer>

The undercoat layer of the electrophotographic photosensitive member according to one embodiment of the present disclosure contains the polymer of the composition containing the electron transporting substances represented by the formula (1) and the formula (2), and the crosslinking agent. The crosslinking agent has a group capable of being bonded to a hydroxy group or a carboxyl group.

In the composition, the mass ratio (mass of formula (1)/mass of formula (2)) of the electron transporting substance represented by the formula (1) to the electron transporting substance represented by the formula (2) is preferably 0.25 or more and 4 or less. The composition containing the electron transporting substances represented by the formula (1) and the formula (2), and the crosslinking agent preferably further contains an electron transporting substance represented by the formula (5).

In addition, the undercoat layer of the electrophotographic photosensitive member according to one embodiment of the present disclosure contains the electron transporting substances represented by the formula (3) and the formula (4). The mass ratio (mass of formula (3)/mass of formula (4)) of the electron transporting substance represented by the formula (3) to the electron transporting substance represented by the formula (4) is preferably 0.25 or more and 4 or less. The undercoat layer containing the electron transporting substances represented by the formula (3) and the formula (4) preferably further contains an electron transporting substance represented by the formula (6).

In addition, the undercoat layer of the electrophotographic photosensitive member preferably contains, as a resin, a resin having a carboxylic acid derivative as a functional group. Examples thereof include an acrylic acid resin and a maleic acid resin.

The thickness of the undercoat layer is preferably 0.2 μm or more and 5.0 μm or less, more preferably 0.5 μm or more and 3.0 μm or less.

The formula (1) to the formula (6) are represented as follows. In addition, exemplified compounds of the formula (1) to the formula (4) are shown in Table 1-1 to Table 1-4 below.

With Regard to each of Formula (1), Formula (2), and Formula (5)

(1)

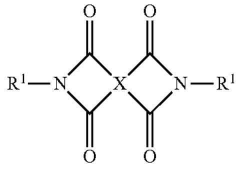

(2)

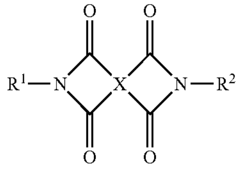

(5)

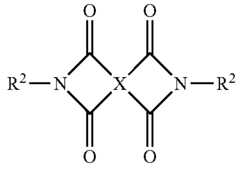

$R^1$ and $R^2$ are not identical to each other, and are each represented by the following formula (10), and X represents any one selected from tetravalent structures represented by the formula (X1), the formula (X2), and the formula (X3) to be described later:

(10)

$$—(R^a)_m—(R^b)_n—R^c$$

in the formula (10), $R^a$ represents a branched or linear alkylene group having 1 or more and 10 or less carbon atoms that may have a substituent, or a phenylene group that may have a substituent, in the formula (10), $R^b$ represents —O—, —S—, or a group represented by the following formula (11):

(11)

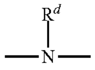

in the formula (11), $R^d$ represents a hydrogen atom, or a branched or linear alkyl group having 1 or more and 4 or less carbon atoms, and in the formula (10), $R^c$ represents a hydrogen atom, a branched or linear alkyl group having 1 or more and 10 or less carbon atoms that may have a substituent, an aryl group having 6 or more and 14 or less carbon atoms that may have a substituent, or a branched or linear arylalkyl group having 7 or more and 18 or less carbon atoms that may have a substituent, the substituent that the alkylene group or the alkyl group may have is a hydroxy group, a carboxyl group, an amino group, a thiol group, an alkoxy group having 1 or more and 3 or less carbon atoms, or an alkoxycarbonyl group having 2 or more and 4 or less carbon atoms, the substituent that the phenylene group, the aryl group, or the arylalkyl group may have is an alkyl group having 1 or more and 3 or less carbon atoms, a hydroxy group, a hydroxyalkyl group having 1 or more and 3 or less carbon atoms, a carboxyl group, an amino group, a thiol group, an alkoxy group having 1 or more and 3 or less carbon atoms, an alkoxycarbonyl group having 2 or more and 4 or less carbon atoms, a halogen atom, a cyano group, or a nitro group, "m" represents 0 or 1, and "n" represents 0 or 1, and at least one selected from the group consisting of $R^1$ and $R^2$ contains a hydroxy group or a carboxyl group.

In each of the formulae (1), (2), and (5), at least one selected from the group consisting of $R^1$ and $R^2$ preferably represents a group represented by the following formula (7):

(7)

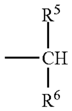

in the formula (7), $R^5$ and $R^6$ each independently represent a group selected from the group consisting of: a branched or linear alkyl group having 1 or more and 7 or less carbon atoms that may have a substituent; a benzyl group; an alkoxycarbonyl group having 2 or more and 4 or less carbon atoms; and a phenyl group, and the substituent that the alkyl group may have is a group selected from the group consisting of: an alkoxycarbonyl group having 2 or more and 4 or less carbon atoms; a phenyl group; a phenol group; a hydroxy group; a thiol group; an amino group; and a carboxyl group.

With Regard to each of Formula (3), Formula (4), and Formula (6)

(3)

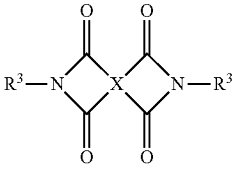

(4)

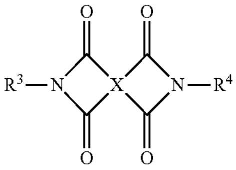

(6)

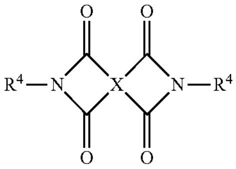

$R^3$ and $R^4$ are not identical to each other, and are each represented by the following formula (10), and X represents any one selected from tetravalent structures represented by the formula (X1), the formula (X2), and the formula (X3) to be described later:

$$-(R^a)_m-(R^b)_n-R^c \quad (10)$$

in the formula (10), $R^a$ represents a branched or linear alkylene group having 1 or more and 10 or less carbon atoms that may have a substituent, or a phenylene group that may have a substituent, in the formula (10), $R^b$ represents —O—, —S—, or a group represented by the following formula (11):

(11)

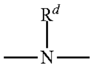

in the formula (11), $R^d$ represents a hydrogen atom, or a branched or linear alkyl group having 1 or more and 4 or less carbon atoms, and in the formula (10), $R^c$ represents a hydrogen atom, a branched or linear alkyl group having 1 or more and 10 or less carbon atoms that may have a substituent, an aryl group having 6 or more and 14 or less carbon atoms that may have a substituent, or a branched or linear arylalkyl group having 7 or more and 18 or less carbon atoms that may have a substituent, the substituent that the alkylene group or the alkyl group may have is a hydroxy group, a carboxyl group, an amino group, a thiol group, an alkoxy group having 1 or more and 3 or less carbon atoms, or an alkoxycarbonyl group having 2 or more and 4 or less carbon atoms, the substituent that the phenylene group, the aryl group, or the arylalkyl group may have is an alkyl group having 1 or more and 3 or less carbon atoms, a hydroxy group, a hydroxyalkyl group having 1 or more and 3 or less carbon atoms, a carboxyl group, an amino group, a thiol group, an alkoxy group having 1 or more and 3 or less carbon atoms, an alkoxycarbonyl group having 2 or more and 4 or less carbon atoms, a halogen atom, a cyano group, or a nitro group, and "m" represents 0 or 1, and "n" represents 0 or 1.

In each of the formulae (3), (4), and (6), at least one selected from the group consisting of $R^3$ or $R^4$ preferably represents a group represented by the following formula (8):

(8)

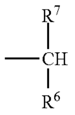

in the formula (8), $R^7$ and $R^1$ each independently represent a group selected from the group consisting of: a branched or linear alkyl group having 1 or more and 7 or less carbon atoms that may have a substituent; a benzyl group; an alkoxycarbonyl group having 2 or more and 4 or less carbon atoms; and a phenyl group, and the substituent that the alkyl group may have is a group selected from the group consisting of: an alkoxycarbonyl group having 2 or more and 4 or less carbon atoms; a phenyl group; a phenol group; a hydroxy group; a thiol group; an amino group; and a carboxyl group.

With Regard to Formula (X1), Formula (X2), and Formula (X3)

X represented in each of the formulae (1), (2), (3), and (4) is selected from tetravalent structures represented by the following formula (X1), the following formula (X2), and the following formula (X3):

(X1)

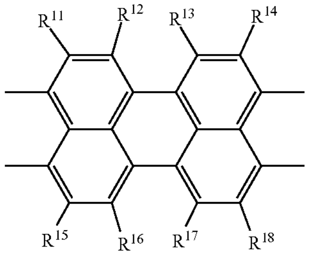

(X2)

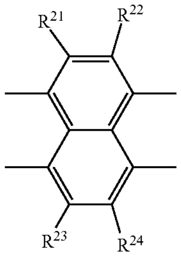

(X3)

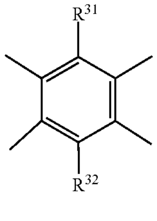

in the formulae (X1), (X2), and (X3), $R^{11}$ to $R^{32}$ each independently represent a hydrogen atom, a halogen atom, a cyano group, or a nitro group.

The derivatives of the electron transporting substances can be purchased from Tokyo Chemical Industry Co., Ltd., Sigma-Aldrich Japan, or Johnson Matthey Japan G.K. A derivative having a structure represented by the formula (X1) can be synthesized by a reaction between perylenetetracarboxylic dianhydride, which can be purchased from Tokyo Chemical Industry Co., Ltd. or Sigma-Aldrich Japan, and a monoamine derivative. A derivative having a structure represented by the formula (X2) can be synthesized by a reaction between naphthalenetetracarboxylic dianhydride, which can be purchased from Tokyo Chemical Industry Co., Ltd. or Johnson Matthey Japan G.K., and a monoamine derivative. A derivative having a structure represented by the formula (X3) can be synthesized by a reaction between benzenetetracarboxylic dianhydride, which can be purchased from Tokyo Chemical Industry Co., Ltd. or Sigma-Aldrich Japan, and a monoamine derivative.

The electron transporting substances are more preferably compounds each having a structure represented by the formula (X1).

In addition, from the viewpoints of film formability and the electrical characteristics of the electrophotographic photosensitive member, the content of the electron transporting substances in the entirety of the undercoat layer is preferably 40 mass % or more and 80 mass % or less, more preferably 50 mass % or more and 70 mass % or less.

In addition, from the viewpoints of the suppression of the formation of a molecular composite and the electrical characteristics, a ratio (formula (1)/formula (2)) between the electron transporting substances represented by the formula (1) and the formula (2), and a ratio (formula (3)/formula (4)) between the electron transporting substances represented by the formula (3) and the formula (4) are each preferably 0.13 or more and 4.0 or less, more preferably 0.25 or more and 4 or less. When the undercoat layer further contains the electron transporting substance represented by the formula (5) in addition to the electron transporting substances represented by the formula (1) and the formula (2), or further contains the electron transporting substance represented by the formula (6) in addition to the electron transporting substances represented by the formula (3) and the formula (4), a ratio (formula (5)/formula (2)) between the electron transporting substances represented by the formula (5) and the formula (2), and a ratio (formula (6)/formula (4)) between the electron transporting substances represented by the formula (6) and the formula (4) are each preferably 0.13 or more and 4.0 or less, more preferably 0.25 or more and 4 or less.

Any known material may be used as the crosslinking agent. Specific examples thereof include compounds described in "Crosslinking Agent Handbook" edited by Shinzo Yamashita and Tosuke Kaneko and published by Taiseisha Ltd. (1981).

The crosslinking agent is preferably an isocyanate compound having an isocyanate group or a blocked isocyanate group, or an amine compound having an N-methylol group or an alkyl-etherified N-methylol group. Of those, an isocyanate compound having 2 to 6 isocyanate groups or blocked isocyanate groups is preferred.

Examples of the isocyanate compound include isocyanate compounds shown below, but the isocyanate compound is not limited thereto. In addition, the isocyanate compounds may be used in combination thereof.

Examples thereof include triisocyanatobenzene, triisocyanatomethylbenzene, triphenylmethane triisocyanate, lysine triisocyanate, diisocyanates, such as tolylene diisocyanate, hexamethylene diisocyanate, dicyclohexylmethane diisocyanate, naphthalene diisocyanate, diphenylmethane diisocyanate, isophorone diisocyanate, xylylene diisocyanate, 2,2,4-trimethylhexamethylene diisocyanate, methyl-2,6-diisocyanate hexanoate, and norbornane diisocyanate, isocyanurate modified forms and biuret modified forms of the isocyanates, biuret type isocyanates, allophanate modified forms of the isocyanates, and adduct modified forms of the isocyanates with trimethylolpropane or pentaerythritol. The blocked isocyanate group is a group having the structure —$NHCOX^1$ ($X^1$ represents a protective group). $X^1$ represents any protective group capable of being be introduced into an isocyanate group.

As a purchasable isocyanate compound, there are given, for example, isocyanate-based crosslinking agents, such as DURANATE MFK-60B, SBA-70B, 17B-60P, SBN-70D, or SBB-70P manufactured by Asahi Kasei Chemicals Corporation, and DESMODUR BL3175 or BL3475 manufactured by Sumika Bayer Urethane Co., Ltd.

The amine compound preferably has an N-methylol group or an alkyl-etherified N-methylol group. In addition, an amine compound having a plurality of (two or more) N-methylol groups or alkyl-etherified N-methylol groups is more preferred. Examples thereof include methylolated melamine, a methylolated guanamine, a methylolated urea derivative, a methylolated ethyleneurea derivative, methylolated glycoluril, and a compound having an alkyl-etherified methylol moiety, and derivatives thereof.

As a purchasable amine compound, there are given, for example, SUPER MELAMI No. 90 (manufactured by NOF Corporation (former Nippon Oil & Fats Co., Ltd.)), SUPER BECKAMINE (trademark) TD-139-60, L-105-60, L127-60, L110-60, J-820-60, and G-821-60 (manufactured by DIC Corporation), U-VAN 2020 (Mitsui Chemicals, Inc.), Sumitex Resin M-3 (manufactured by Sumitomo Chemical Company, Limited (former Sumitomo Chemical Industry Company Limited)), NIKALAC MW-30, MW-390, and MX-750LM (manufactured by Sanwa Chemical Co., Ltd.), SUPER BECKAMINE (trademark) L-148-55, 13-535, L-145-60, and TD-126 (manufactured by DIC Corporation), NIKALAC BL-60 and BX-4000 (manufactured by Sanwa Chemical Co., Ltd.), and NIKALAC MX-280, NIKALAC MX-270, and NIKALAC MX-290 (manufactured by Sanwa Chemical Co., Ltd.).

The composition for an undercoat layer may further contain a thermoplastic resin having a polymerizable functional group in addition to the electron transporting substance and the crosslinking agent. Examples of the thermoplastic resin include a polyacetal resin, a polyvinyl acetal resin, a polyolefin resin, a polyester resin, a polyether resin, and a polyamide resin. The polymerizable functional group is preferably a group polymerizable by the crosslinking agent, and examples thereof include a hydroxy group, a thiol group, an amino group, a carboxyl group, and a methoxy group.

Further, the thermoplastic resin is preferably a thermoplastic resin having a repeating unit formed of $—(CH_2—CH_2—O)_n—$ ("n" represents an integer of 2 or more and 200 or less), $—(CH_2—CH_3CH—O)_n—$ ("n" represents an integer of 2 or more and 200 or less), or $—(CH_2—CH_2—O—CH_2—CH_2—S—S)_n—$ ("n" represents an integer of 2 or more and 50 or less).

As products commercially available as the thermoplastic resins each having a polymerizable functional group, there are given, for example: polyether polyol-based resins, such as AQD-457 and AQD-473 (all of which are manufactured by Nippon Polyurethane Industry Co., Ltd.), and GP-400 and GP-700 (all of which are SANNIX manufactured by Sanyo Chemical Industries, Ltd.); polyester polyol-based resins, such as PHTHALKYD W2343 (manufactured by Hitachi Chemical Co., Ltd.), WATERSOL S-118, CD-520, BECKOLITE M-6402-50, and M-6201-40IM (all of which are manufactured by DIC Corporation), HARIDIP WH-1188 (manufactured by Harima Chemicals, Inc.), and ES3604 and ES6538 (all of which are manufactured by Japan U-Pica Company Ltd.); polyacrylic polyol-based resins, such as BURNOCK WE-300 and WE-304 (all of which are manufactured by DIC Corporation); polyvinyl alcohol-based resins such as KURARAY POVAL PVA-203 (manufactured by Kuraray Co., Ltd.); polyvinyl acetal-based resins, such as BX-1, BM-1, and KS-5 (all of which are manufactured by Sekisui Chemical Co., Ltd.); polyamide-based resins such as TORESIN FS-350 (manufactured by Nagase ChemteX Corporation); carboxyl group-containing resins, such as AQUALIC (manufactured by Nippon Shokubai Co., Ltd.) and FINELEX SG2000 (manufactured by Namariichi Co., Ltd.); polyamine resins such as LUCKAMIDE (manufactured by DIC Corporation); and polythiol resins such as QE-340M (manufactured by Toray Industries, Inc.). Of those, for example, a polyvinyl acetal-based resin having a polymerizable functional group, and a polyester polyol-based resin having a polymerizable functional group are preferred from the viewpoint of polymerizability.

The undercoat layer may be formed by a method including: forming a coating film of a coating liquid for an undercoat layer containing the above-mentioned substances; and drying the coating film. When such composition is polymerized at the time of the drying of the coating film of the coating liquid for an undercoat layer, the polymerization reaction (curing reaction) is accelerated by applying thermal or optical energy. A solvent to be used in the coating liquid for an undercoat layer is, for example, an alcohol-based solvent, a sulfoxide-based solvent, a ketone-based solvent, an ether-based solvent, an ester-based solvent, or an aromatic hydrocarbon solvent.

<Charge Generating Layer>

The charge generating layer preferably contains the charge generating substance and the binder resin.

Examples of the charge generating substance include azo pigments, perylene pigments, anthraquinone derivatives, anthanthrone derivatives, dibenzopyrene quinone derivatives, pyranthrone derivatives, quinone pigments, indigoid pigments, phthalocyanine pigments, and perinone pigments. Of those, phthalocyanine pigments are preferred. Of the phthalocyanine pigments, oxytitanium phthalocyanine, chlorogallium phthalocyanine, and hydroxygallium phthalocyanine are preferred.

Examples of the binder resin include styrene, vinyl acetate, vinyl chloride, an acrylic acid ester, a methacrylic acid ester, polymers and copolymers of vinyl compounds, such as vinylidene fluoride and trifluoroethylene, polyvinyl alcohol, polyvinyl acetal, polycarbonate, polyester, polysulfone, polyphenylene oxide, polyurethane, a cellulose resin, a phenol resin, a melamine resin, a silicon resin, and an epoxy resin. Of those, polyester, polycarbonate, and polyvinyl acetal are preferred.

In the charge generating layer, the ratio (charge generating substance/binder resin) of the charge generating substance to the binder resin preferably falls within the range of from 10/1 to 1/10, and more preferably falls within the range of from 5/1 to 1/5.

A solvent to be used in a coating liquid for a charge generating layer is, for example, an alcohol-based solvent, a ketone-based solvent, an ether-based solvent, an ester-based solvent, or an aromatic hydrocarbon solvent.

The thickness of the charge generating layer is preferably 0.05 μm or more and 5 μm or less.

<Charge Transporting Layer>

The charge transporting layer preferably contains the charge transporting substance and the binder resin. The charge transporting substance is preferably a hole-transporting substance. The charge transporting layer is preferably a hole-transporting layer.

Examples of the charge transporting substance include a hydrazone compound, a styryl compound, a benzidine compound, a butadiene compound, an enamine compound, a triarylamine compound, and triphenylamine. Another example thereof is a polymer having a group derived from each of those compounds in a main chain or side chain thereof.

Examples of the binder resin include polyester, polycarbonate, a polymethacrylic acid ester, polyarylate, polysulfone, and polystyrene. Of those, polycarbonate and polyarylate are preferred. In addition, the weight average molecular weight (Mw) thereof preferably falls within the range of from 10,000 to 300,000.

In the charge transporting layer, the ratio (charge transporting substance/binder resin) of the charge transporting substance to the binder resin preferably falls within the range of from 10/5 to 5/10, and more preferably falls within the range of from 10/8 to 6/10.

The thickness of the charge transporting layer is preferably 5 μm or more and 40 μm or less.

A solvent to be used in a coating liquid for a charge transporting layer is, for example, an alcohol-based solvent, a ketone-based solvent, an ether-based solvent, an ester-based solvent, or an aromatic hydrocarbon solvent.

<Other Layer>

A protection layer containing electroconductive particles or a charge transporting substance and a binder resin may be arranged on the charge transporting layer. An additive such as a lubricant may be further incorporated into the protection layer. In addition, conductivity or a charge transporting property may be imparted to the binder resin itself of the protection layer. In that case, the electroconductive particles or the charge transporting substance except the binder resin may not be incorporated into the protection layer. In addition, the binder resin of the protection layer may be a thermoplastic resin, or may be a curable resin that may be cured with, for example, heat, light, or a radiation (e.g., an electron beam).

[Process Cartridge and Electrophotographic Apparatus]

Figure 1:
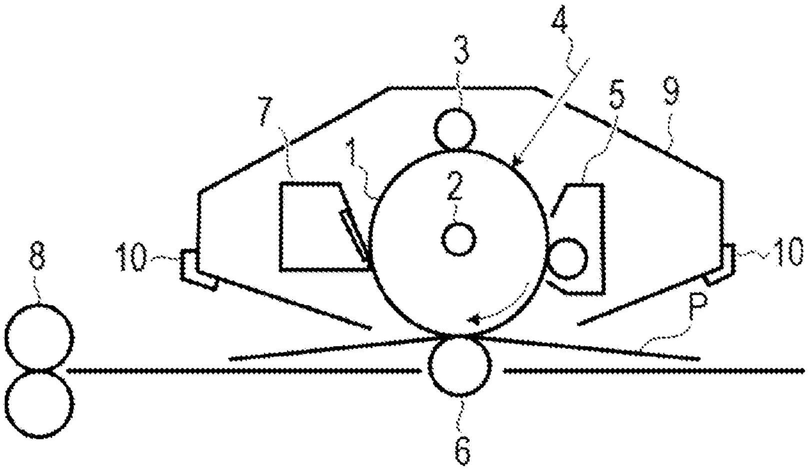
FIG. 1 is a view for illustrating a schematic configuration in an example of an electrophotographic apparatus including a process cartridge including an electrophotographic photosensitive member.

The schematic configuration of an electrophotographic apparatus including a process cartridge including an electrophotographic photosensitive member is illustrated in FIG. 1. In FIG. 1, an electrophotographic photosensitive member 1 having a cylindrical shape is rotationally driven about a shaft 2 in an arrow direction at a predetermined peripheral speed. The surface (peripheral surface) of the electrophotographic photosensitive member 1 that is rotationally driven is charged to a predetermined positive or negative potential by a charging unit 3 (e.g., a contact charger or a non-contact charger). Next, the surface is exposed to exposure light (image exposure light) 4 from an exposing unit (not shown), such as slit exposure or laser beam scanning exposure. Thus, electrostatic latent images corresponding to a target image are sequentially formed on the surface of the electrophotographic photosensitive member 1.

Next, the electrostatic latent images formed on the surface of the electrophotographic photosensitive member 1 are developed with toner in the developer of a developing unit 5 to provide toner images. The toner images formed and carried on the surface of the electrophotographic photosensitive member 1 are sequentially transferred onto a transfer material P (e.g., paper) by a transfer bias from a transferring unit 6 (e.g., a transfer roller). The transfer material P is fed from a transfer material-supplying unit (not shown) to a space (abutting portion) between the electrophotographic photosensitive member 1 and the transferring unit 6 in synchronization with the rotation of the electrophotographic photosensitive member 1.

The transfer material P after the transfer of the toner images is separated from the surface of the electrophotographic photosensitive member 1, and is introduced into a fixing unit 8 to be subjected to image fixation. Thus, the transfer material is printed out as an image-formed product (a print or a copy) to the outside of the apparatus.

The transfer residual developer (transfer residual toner) is removed from the surface of the electrophotographic photosensitive member 1 after the transfer of the toner images by a cleaning unit 7 (e.g., a cleaning blade) so that the surface may be cleaned. Next, the surface is subjected to electricity-removing treatment with pre-exposure light (not shown) from a pre-exposing unit (not shown), and is then repeatedly used in image formation. When the charging unit 3 is a contact charging unit using a charging roller as illustrated in FIG. 1, the pre-exposure is not necessarily required.

The following configuration may be adopted: the electrophotographic photosensitive member 1, and at least one unit selected from the group consisting of: the charging unit 3; the developing unit 5; the transferring unit 6; and the cleaning unit 7 are stored in a container and integrally supported as a process cartridge, and the process cartridge is made detachably attachable to the main body of the electrophotographic apparatus. In FIG. 1, the electrophotographic photosensitive member 1, the charging unit 3, the developing unit 5, and the cleaning unit 7 are integrally supported to provide a cartridge, and the cartridge is used as a process cartridge 9 detachably attachable to the main body of the electrophotographic apparatus through use of the guiding unit 10 of the main body of the electrophotographic apparatus such as a rail.

According to the present disclosure, there can be provided the electrophotographic photosensitive member, which shows stable sensitivity even when repeatedly used for a long time period, and the process cartridge and the electrophotographic apparatus each including the above-mentioned electrophotographic photosensitive member.

EXAMPLES

The embodiment according to the present disclosure is described in more detail below by way of Examples. In Examples, the term "part(s)" means "part(s) by mass."

<Synthesis of Electron Transporting Substance>

Under a nitrogen atmosphere, 2.0 parts of perylenetetracarboxylic dianhydride (manufactured by Tokyo Chemical Industry Co., Ltd.) and 2.2 parts of L-(+)-leucinol (manufactured by Tokyo Chemical Industry Co., Ltd.) were added to 20 parts of dimethylacetamide, and the mixture was refluxed for 10 hours, followed by separation by silica gel column chromatography (developing solvent: THF/toluene). After that, a fraction containing a target product was concentrated. The concentrate was recrystallized with a mixed solution containing THE and n-hexane to provide 2.0 parts of Exemplified Compound A1-1 shown in Table 1-1.

Figure 3:
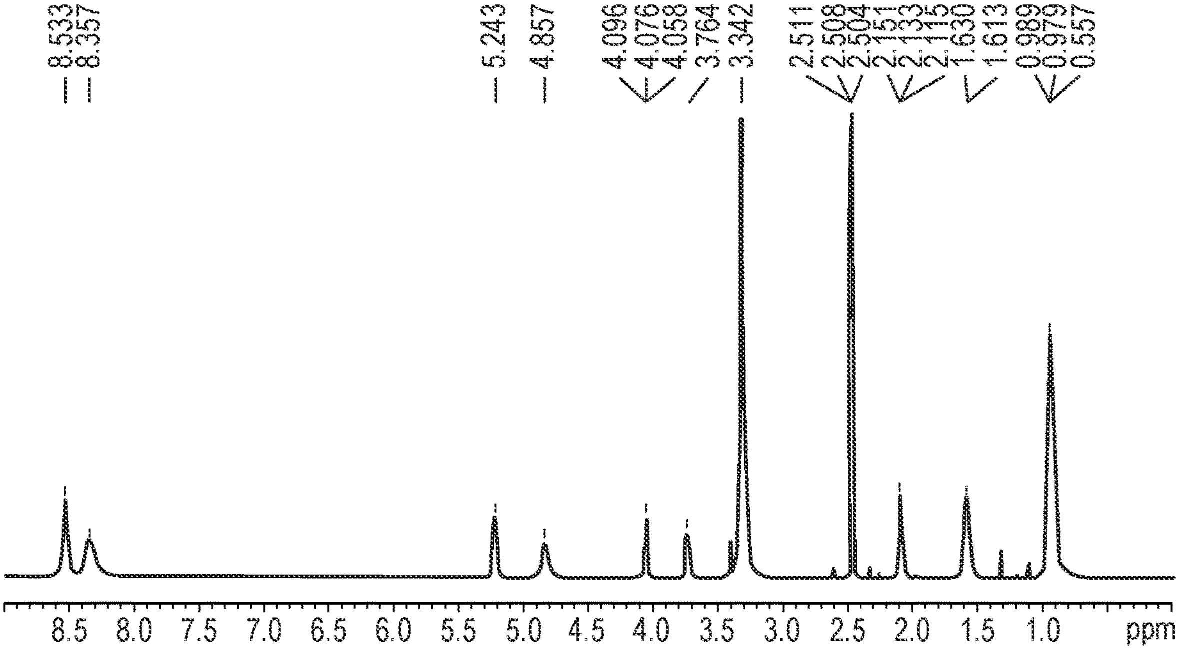
FIG. 3 is a graph for showing the $^1$H-NMR spectrum of an electron transporting substance A1-1.

The NMR spectrum of Exemplified Compound A1-1 measured with a nuclear magnetic resonance apparatus is shown in FIG. 3.

Measurement apparatus used: manufactured by Bruker, AVANCE III 500

Solvent: deuterochloroform ($CDCl_3$)

Number of scans: 256

<Production of Electrophotographic Photosensitive Member>

Example 1

An aluminum cylinder (JIS-A3003, aluminum alloy) having a length of 260.5 mm and a diameter of 30 mm was subjected to cutting processing (JIS B 0601: 2014, ten-point average roughness Rzjis: 0.8 m), and the processed aluminum cylinder was used as a support (electroconductive support).

Next, 3.00 parts of Exemplified Compound (A1-1) shown in Table 1-1, which served as a first electron transporting substance, 3.00 parts of Exemplified Compound (A1-18) shown in Table 1-1, which served as a second electron transporting substance, 0.10 part of a polyolefin resin (product name: UC-3920, manufactured by Toagosei Co., Ltd.) and 0.10 part of a polyvinyl acetal resin (product name: KS-5Z, manufactured by Sekisui Chemical Co., Ltd.) serving as resins, and 8.20 parts of a blocked isocyanate compound (product name: SBB-70P, manufactured by Asahi Kasei Corporation) serving as a crosslinking agent were dissolved in a mixed solvent containing 88 parts of THF and 12 parts of orthoxylene. After that, the solution was filtered with a Teflon (trademark)-made filter (product name: PF020) manufactured by ADVANTEC under pressure. The resultant coating liquid for an undercoat layer was applied onto the electroconductive layer by dip coating, and the resultant coating film was heated at 170° C. for 40 minutes to be cured (polymerized). Thus, an undercoat layer having a thickness of 1.5 μm was formed.

Next, a hydroxygallium phthalocyanine crystal (charge generating substance) of a crystal form having strong peaks at Bragg angles (2θ±0.2°) of 7.5°, 9.9°, 12.5°, 16.3°, 18.6°, 25.1°, and 28.3° in CuKα characteristic X-ray diffraction was prepared. 10 Parts of the hydroxygallium phthalocyanine crystal, 5 parts of a polyvinyl butyral resin (product name: S-LEC BX-1, manufactured by Sekisui Chemical Co., Ltd.), and 250 parts of cyclohexanone were loaded into a sand mill using glass beads each having a diameter of 1 mm, and were subjected to dispersion treatment for 2 hours. Next, 250 parts of ethyl acetate was added to the resultant to prepare a coating liquid for a charge generating layer. The coating liquid for a charge generating layer was applied onto the undercoat layer by dip coating to form a coating film, and the resultant coating film was dried at a temperature of 95° C. for 10 minutes to form a charge generating layer having a thickness of 0.15 μm.

Next, 5 parts of a compound represented by the following formula (B-1) and 5 parts of a compound represented by the following formula (B-2) serving as charge transporting substances (hole-transporting substances), and 10 parts of polycarbonate (product name: IUPILON Z-400, manufactured by Mitsubishi Engineering-Plastics Corporation) were dissolved in a mixed solvent containing 25 parts of orthoxylene, 25 parts of methyl benzoate, and 25 parts of dimethoxymethane to prepare a coating liquid for a charge transporting layer.

The thus prepared coating liquid for a charge transporting layer was applied onto the above-mentioned charge generating layer by dip coating to form a coating film, and the coating film was dried by heating at a temperature of 120° C. for 30 minutes to form a charge transporting layer having a thickness of 25 μm.

(B-1)

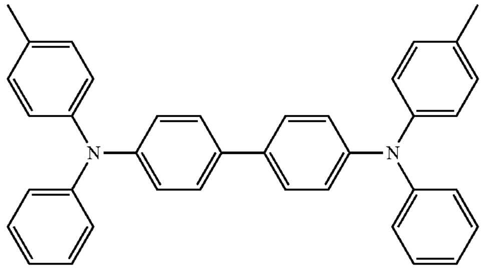

(B-2)

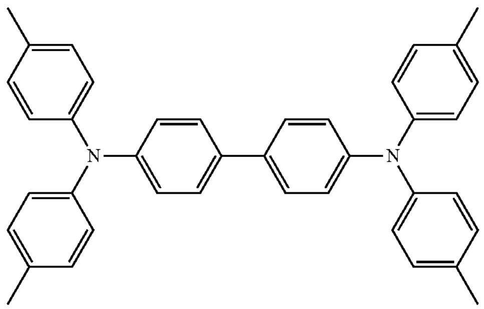

Thus, an electrophotographic photosensitive member including, on the support, the electroconductive layer, the undercoat layer, the charge generating layer, and the charge transporting layer was produced.

[Sensitivity Evaluation]

The electrophotographic photosensitive member was mounted on an apparatus obtained by reconstructing a laser beam printer (product name: LBP-2510) manufactured by Canon Inc., and the following process conditions were set. Then, the photosensitive member was evaluated for its surface potential (potential fluctuation). The printer was reconstructed as follows: its process speed was changed to 200 mm/s, the dark portion potential of the photosensitive member became −700 V, and the quantity of its exposure light (image exposure light) became variable. Details about the evaluation are as described below.

Under an environment at a temperature of 23° C. and a humidity of 50% RH, a cartridge for development was removed from the evaluation machine, and a potential-measuring device was inserted into the position of the cartridge to measure the surface potential. The potential-measuring device was formed by arranging a potential-measuring probe at the developing position of the cartridge for development, and the position of the potential-measuring probe with respect to the electrophotographic photosensitive member was set to the center in the shaft direction of the drum of the photosensitive member. The sensitivity of the photosensitive member was judged by the light portion potential thereof when the same quantity of light was applied thereto. When the light portion potential is low, the sensitivity can be evaluated to be satisfactory, and when the light portion potential is high, the sensitivity can be evaluated to be low.

First, the initial potential of the photosensitive member was measured while the quantity of light was set to 0.3 $J/cm^2$. Next, the light portion potentials thereof after the output of an image on 20,000 sheets and after the output thereof on 40,000 sheets were measured, and a difference (change amount) between the initial potential and each of the light portion potentials was calculated. The evaluation results are shown in Table 2.

Examples 2 to 15

Electrophotographic photosensitive members were each produced in the same manner as in Example 1 except that the kinds of the electron transporting substances to be mixed into the coating liquid for an undercoat layer, and the amounts thereof were changed as shown in Table 2, and the photosensitive members were similarly evaluated. The results are shown in Table 2.

Example 16

An electrophotographic photosensitive member was produced in the same manner as in Example 1 except that a coating liquid for an undercoat layer was prepared as described below and used. The results are shown in Table 2.

<Coating Liquid for Undercoat Layer>

1.50 Parts of Exemplified Compound (A1-1) shown in Table 1-1, which served as a first electron transporting substance, 3.00 parts of Exemplified Compound (A1-18) shown in Table 1-1, which served as a second electron transporting substance, 1.50 parts of Exemplified Compound (A1-5) shown in Table 1-1, which served as a third electron transporting substance, 0.10 part of a polyolefin resin (product name: UC-3920, manufactured by Toagosei Co., Ltd.) and 0.10 part of a polyvinyl acetal resin (product name: KS-5Z, manufactured by Sekisui Chemical Co., Ltd.) serving as resins, and 8.20 parts of a blocked isocyanate compound (product name: SBB-70P, manufactured by Asahi Kasei Corporation) serving as a crosslinking agent were dissolved in a mixed solvent containing 88 parts of THF and 12 parts of orthoxylene. After that, the solution was filtered with a Teflon (trademark)-made filter (product name: PF020) manufactured by ADVANTEC under pressure. The resultant coating liquid for an undercoat layer was applied onto the electroconductive layer by dip coating, and the resultant coating film was heated at 170° C. for 40 minutes to be cured (polymerized). Thus, an undercoat layer having a thickness of 1.5 μm was formed.

Examples 17 to 31

Electrophotographic photosensitive members were each produced in the same manner as in Example 16 except that the kinds of the electron transporting substances to be mixed into the coating liquid for an undercoat layer, and the amounts thereof were changed as shown in Table 2, and the photosensitive members were similarly evaluated. The results are shown in Table 2.

Example 32

An electrophotographic photosensitive member was produced in the same manner as in Example 16 except that an aluminum cylinder having a diameter of 30 mm and a length of 260.5 mm was used as a support, and the following electroconductive layer was formed between the support layer and the undercoat layer, and the photosensitive member was evaluated. The results are shown in Table 2.

Anatase type titanium oxide having a primary particle diameter of 200 nm on average was used as a base, and a titanium-niobium sulfuric acid solution containing 33.7 parts of titanium in terms of $TiO_2$ and 2.9 parts of niobium in terms of $Nb_2O_5$ was prepared. 100 Parts of the base was dispersed in pure water to provide 1,000 parts of a suspension, and the suspension was warmed to 60° C. The titanium-niobium sulfuric acid solution and 10 mol/L sodium hydroxide were dropped into the suspension over 3 hours so that the suspension had a pH of from 2 to 3. After the total amount of the solutions had been dropped, the pH was adjusted to a value near a neutral region, and a polyacrylamide-based flocculant was added to the mixture to sediment a solid content. The supernatant was removed, and the residue was filtered and washed, followed by drying at 110° C. Thus, an intermediate containing 0.1 wt % of organic matter derived from the flocculant in terms of C was obtained. The intermediate was calcined in nitrogen at 750° C. for 1 hour, and was then calcined in air at 450° C. to produce titanium oxide particles. The resultant particles had an average particle diameter (average primary particle diameter) of 220 nm in the above-mentioned particle diameter measurement method using a scanning electron microscope.

Subsequently, 50 parts of a phenol resin (monomer/oligomer of a phenol resin) (product name: PLYOPHEN J-325, manufactured by DIC Corporation, resin solid content: 60%, density after curing: 1.3 $g/cm^2$) serving as a binding material was dissolved in 35 parts of 1-methoxy-2-propanol serving as a solvent to provide a solution.

60 Parts of the titanium oxide particles 1 were added to the solution. The mixture was loaded into a vertical sand mill using 120 parts of glass beads having an average particle diameter of 1.0 mm as a dispersion medium, and was subjected to dispersion treatment under the conditions of a dispersion liquid temperature of 23±3° C. and a number of revolutions of 1,500 rpm (peripheral speed: 5.5 m/s) for 4 hours to provide a dispersion liquid. The glass beads were removed from the dispersion liquid with a mesh. 0.01 Part of a silicone oil (product name: SH28 PAINT ADDITIVE, manufactured by Dow Corning Toray Co., Ltd.) serving as a leveling agent and 8 parts of silicone resin particles (product name: KMP-590, manufactured by Shin-Etsu Chemical Co., Ltd., average particle diameter: 2 m, density: 1.3 $g/cm^3$) serving as a surface roughness-imparting material were added to the dispersion liquid after the removal of the glass beads, and the mixture was stirred and filtered with PTFE filter paper (product name: PF060, manufactured by Advantec Toyo Kaisha, Ltd.) under pressure to prepare a coating liquid for an electroconductive layer.

The thus prepared coating liquid for an electroconductive layer was applied onto the above-mentioned support by dip coating to form a coating film, and the coating film was heated at 150° C. for 20 minutes to be cured, to thereby form an electroconductive layer having a thickness of 25 μm.

Example 33

An electrophotographic photosensitive member was produced in the same manner as in Example 1 except that a coating liquid for an undercoat layer was prepared as described below and used. The results are shown in Table 2.

<Coating Liquid for Undercoat Layer>

3.00 Parts of Exemplified Compound (A1-15) shown in Table 1-1, which served as a first electron transporting substance, 3.00 parts of Exemplified Compound (A1-33) shown in Table 1-2, which served as a second electron transporting substance, and 4.00 parts of a polyvinyl acetal resin (product name: KS-5Z, manufactured by Sekisui Chemical Co., Ltd.) serving as a resin were dissolved in a mixed solvent containing 88 parts of THE and 12 parts of orthoxylene. After that, the solution was filtered with a Teflon (trademark)-made filter (product name: PF020) manufactured by ADVANTEC under pressure. The resultant coating liquid for an undercoat layer was applied onto the electroconductive layer by dip coating, and the resultant coating film was heated at 125° C. for 30 minutes to be cured (polymerized). Thus, an undercoat layer having a thickness of 1.5 μm was formed.

Examples 34 to 42

Electrophotographic photosensitive members were each produced in the same manner as in Example 33 except that the kinds of the electron transporting substances to be mixed into the coating liquid for an undercoat layer, and the amounts thereof were changed as shown in Table 2, and the photosensitive members were similarly evaluated. The results are shown in Table 2.

TABLE 1

| Exemplified Compound | Structure |
|---|---|
| A1-1 | 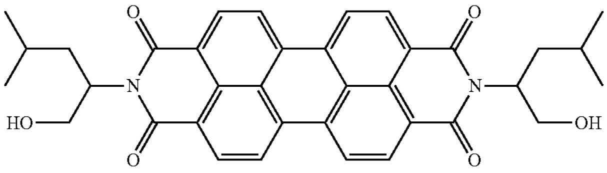 [SMILES: CC(C)CC(CO)N1C(=O)c2ccc3c4ccc5c6c(ccc(c7ccc(c2c37)C1=O)c64)C(=O)N(C(CO)CC(C)C)C5=O] |
| A1-2 | 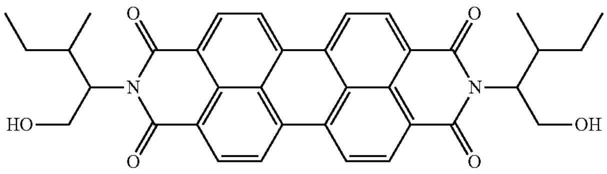 |
| A1-3 | 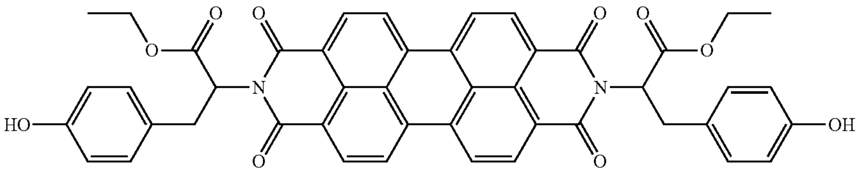 [SMILES: CCOC(=O)C(Cc1ccc(O)cc1)N1C(=O)c2ccc3c4ccc5c6c(ccc(c7ccc(c2c37)C1=O)c64)C(=O)N(C(Cc1ccc(O)cc1)C(=O)OCC)C5=O] |
| A1-4 | 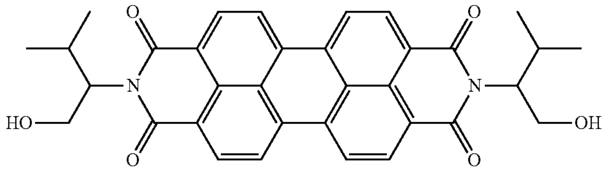 [SMILES: CC(C)C(CO)N1C(=O)c2ccc3c4ccc5c6c(ccc(c7ccc(c2c37)C1=O)c64)C(=O)N(C(CO)C(C)C)C5=O] |
| A1-5 | 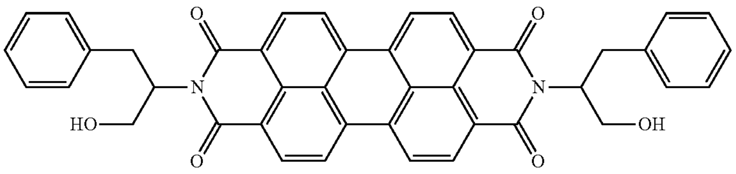 [SMILES: O=C1c2ccc3c4ccc5c6c(ccc(c7ccc(c2c37)C(=O)N1C(CO)Cc1ccccc1)c64)C(=O)N(C(CO)Cc1ccccc1)C5=O] |
| A1-6 | 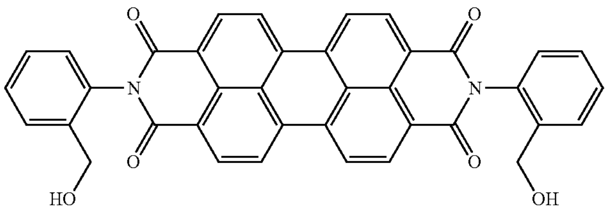 [SMILES: O=C1c2ccc3c4ccc5c6c(ccc(c7ccc(c2c37)C(=O)N1c1ccccc1CO)c64)C(=O)N(c1ccccc1CO)C5=O] |

TABLE 1-continued
| Exemplified Compound | Structure |
| --- | --- |
| A1-7 | 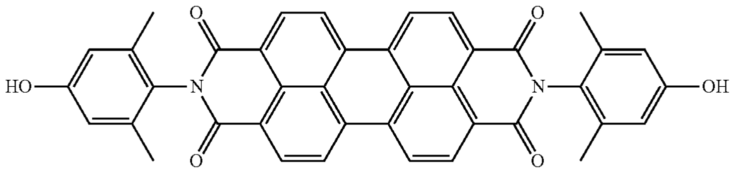 [SMILES: Cc1cc(O)cc(C)c1N1C(=O)c2ccc3c4ccc5c6c(ccc(c7ccc(c2c37)C1=O)c64)C(=O)N(c1c(C)cc(O)cc1C)C5=O] |
| A1-8 | 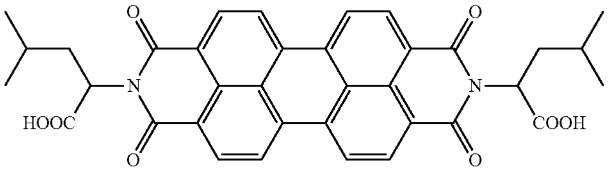 [SMILES: CC(C)CC(C(=O)O)N1C(=O)c2ccc3c4ccc5c6c(ccc(c7ccc(c2c37)C1=O)c64)C(=O)N(C(CC(C)C)C(=O)O)C5=O] |
| A1-9 | 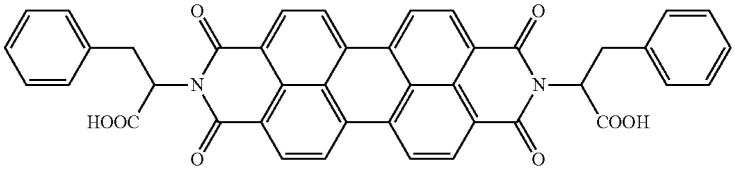 [SMILES: O=C(O)C(Cc1ccccc1)N1C(=O)c2ccc3c4ccc5c6c(ccc(c7ccc(c2c37)C1=O)c64)C(=O)N(C(Cc1ccccc1)C(=O)O)C5=O] |
| A1-10 | 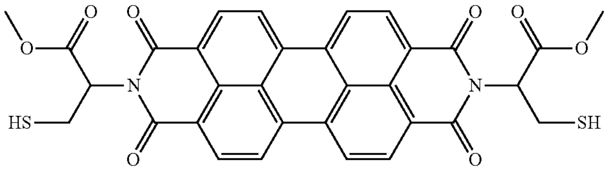 |
| A1-11 | 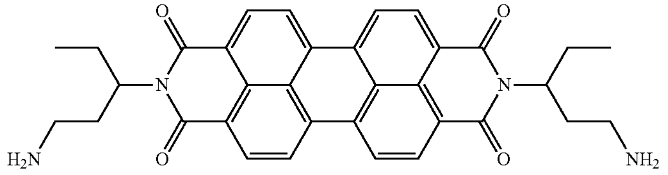 [SMILES: CCC(CCN)N1C(=O)c2ccc3c4ccc5c6c(ccc(c7ccc(c2c37)C1=O)c64)C(=O)N(C(CC)CCN)C5=O] |
| A1-12 | 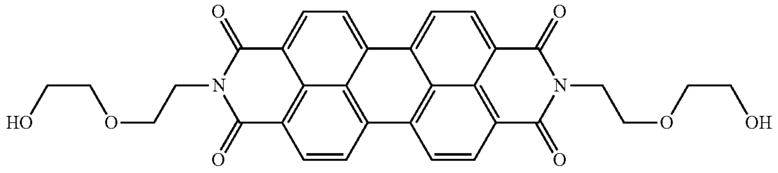 [SMILES: O=C1c2ccc3c4ccc5c6c(ccc(c7ccc(c2c37)C(=O)N1CCOCCO)c64)C(=O)N(CCOCCO)C5=O] |
| A1-13 | 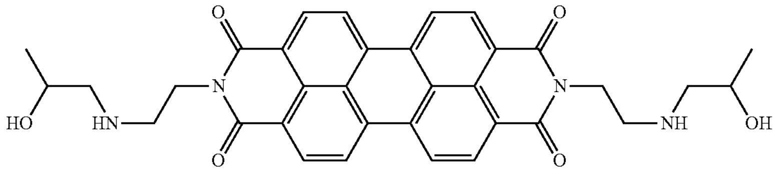 [SMILES: CC(O)CNCCN1C(=O)c2ccc3c4ccc5c6c(ccc(c7ccc(c2c37)C1=O)c64)C(=O)N(CCNCC(C)O)C5=O] |
| A1-14 | 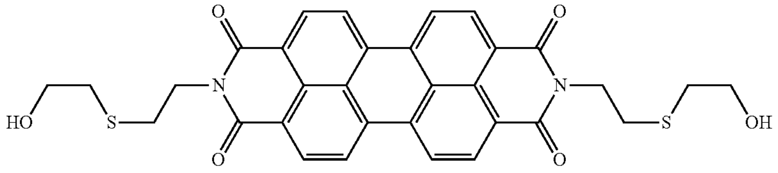 |

TABLE 1-continued
| Exemplified Compound | Structure |
|---|---|
| A1-15 | 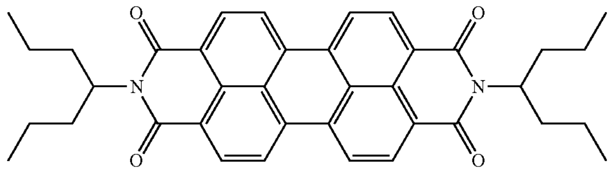 [SMILES: CCCC(CCC)N1C(=O)c2ccc3c4ccc5c6c(ccc(c7ccc(c2c37)C1=O)c64)C(=O)N(C(CCC)CCC)C5=O] |
| A1-16 | 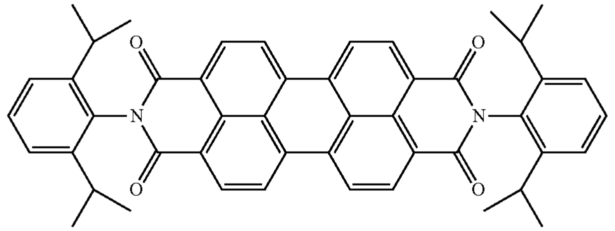 [SMILES: CC(C)c1cccc(C(C)C)c1N1C(=O)c2ccc3c4ccc5c6c(ccc(c7ccc(c2c37)C1=O)c64)C(=O)N(c1c(C(C)C)cccc1C(C)C)C5=O] |
| A1-17 | 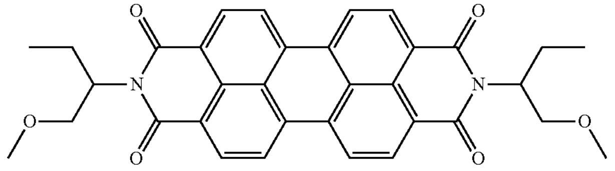 |
| A1-18 | 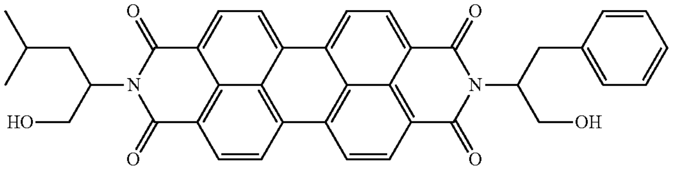 [SMILES: CC(C)CC(CO)N1C(=O)c2ccc3c4ccc5c6c(ccc(c7ccc(c2c37)C1=O)c64)C(=O)N(C(CO)Cc1ccccc1)C5=O] |
| A1-19 | 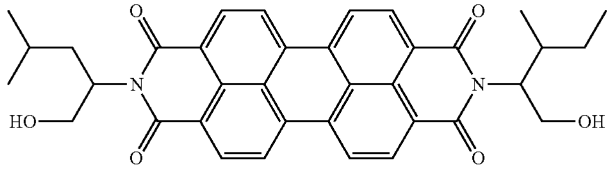 [SMILES: CCC(C)C(CO)N1C(=O)c2ccc3c4ccc5c6c(ccc(c7ccc(c2c37)C1=O)c64)C(=O)N(C(CO)CC(C)C)C5=O] |
| A1-20 | 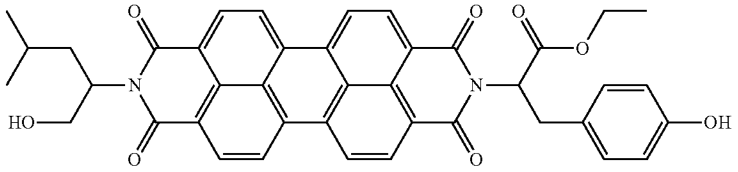 [SMILES: CCOC(=O)C(Cc1ccc(O)cc1)N1C(=O)c2ccc3c4ccc5c6c(ccc(c7ccc(c2c37)C1=O)c64)C(=O)N(C(CO)CC(C)C)C5=O] |
| A1-21 | 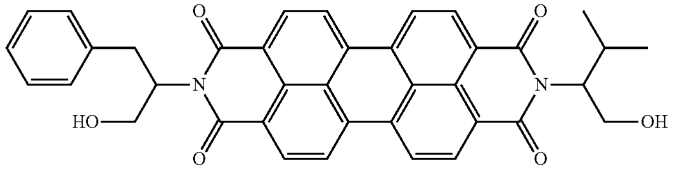 [SMILES: CC(C)C(CO)N1C(=O)c2ccc3c4ccc5c6c(ccc(c7ccc(c2c37)C1=O)c64)C(=O)N(C(CO)Cc1ccccc1)C5=O] |
| A1-22 | 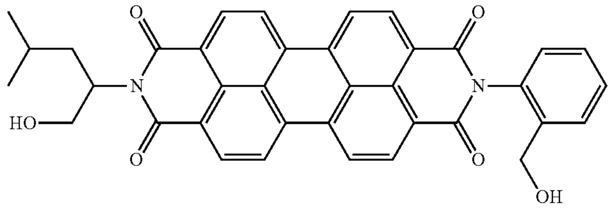 [SMILES: CC(C)CC(CO)N1C(=O)c2ccc3c4ccc5c6c(ccc(c7ccc(c2c37)C1=O)c64)C(=O)N(c1ccccc1CO)C5=O] |

TABLE 1-continued
| Exemplified Compound | Structure |
|---|---|
| A1-23 | 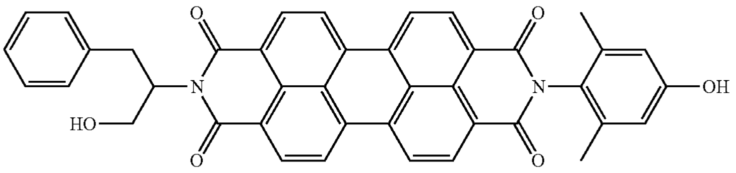 [SMILES: Cc1cc(O)cc(C)c1N1C(=O)c2ccc3c4ccc5c6c(ccc(c7ccc(c2c37)C1=O)c64)C(=O)N(C(CO)Cc1ccccc1)C5=O] |
| A1-24 | 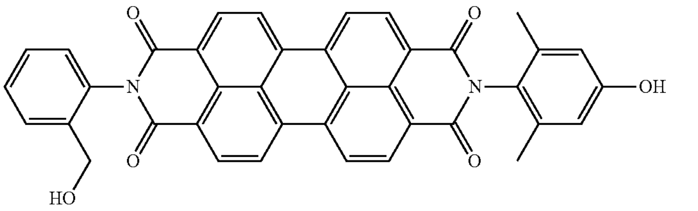 [SMILES: Cc1cc(O)cc(C)c1N1C(=O)c2ccc3c4ccc5c6c(ccc(c7ccc(c2c37)C1=O)c64)C(=O)N(c1ccccc1CO)C5=O] |
| A1-25 | 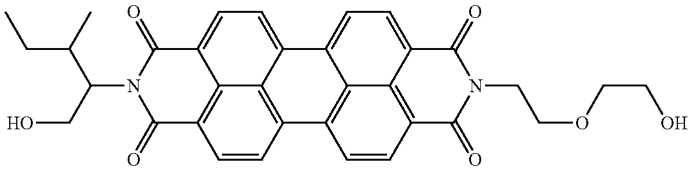 [SMILES: CCC(C)C(CO)N1C(=O)c2ccc3c4ccc5c6c(ccc(c7ccc(c2c37)C1=O)c64)C(=O)N(CCOCCO)C5=O] |
| A1-26 | 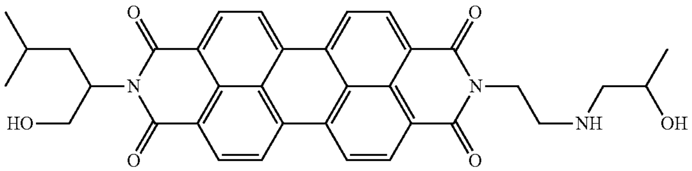 [SMILES: CC(C)CC(CO)N1C(=O)c2ccc3c4ccc5c6c(ccc(c7ccc(c2c37)C1=O)c64)C(=O)N(CCNCC(C)O)C5=O] |
| A1-27 | 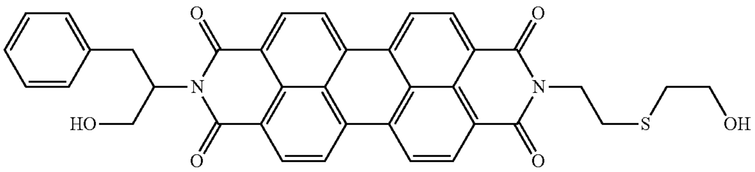 [SMILES: O=C1c2ccc3c4ccc5c6c(ccc(c7ccc(c2c37)C(=O)N1CCSCCO)c64)C(=O)N(C(CO)Cc1ccccc1)C5=O] |
| A1-28 | 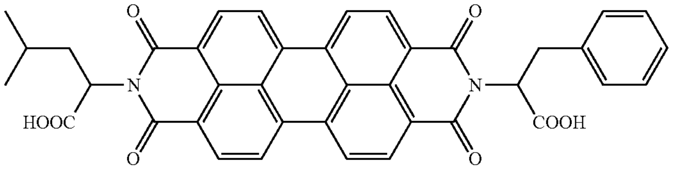 [SMILES: CC(C)CC(C(=O)O)N1C(=O)c2ccc3c4ccc5c6c(ccc(c7ccc(c2c37)C1=O)c64)C(=O)N(C(Cc1ccccc1)C(=O)O)C5=O] |
| A1-29 | 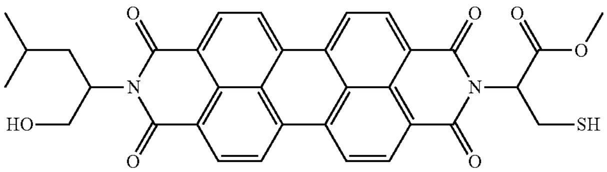 [SMILES: COC(=O)C(CS)N1C(=O)c2ccc3c4ccc5c6c(ccc(c7ccc(c2c37)C1=O)c64)C(=O)N(C(CO)CC(C)C)C5=O] |
| A1-30 | 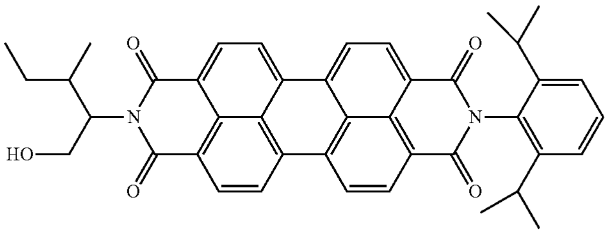 [SMILES: CCC(C)C(CO)N1C(=O)c2ccc3c4ccc5c6c(ccc(c7ccc(c2c37)C1=O)c64)C(=O)N(c1c(C(C)C)cccc1C(C)C)C5=O] |

TABLE 1-continued
| Exemplified Compound | Structure |
| --- | --- |
| A1-31 | 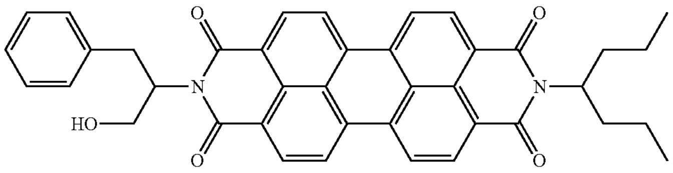 [SMILES: CCCC(CCC)N1C(=O)c2ccc3c4ccc5c6c(ccc(c7ccc(c2c37)C1=O)c64)C(=O)N(C(CO)Cc1ccccc1)C5=O] |
| A1-32 | 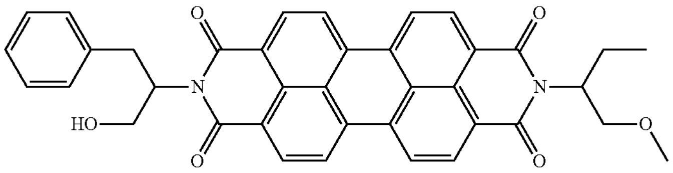 [SMILES: CCC(COC)N1C(=O)c2ccc3c4ccc5c6c(ccc(c7ccc(c2c37)C1=O)c64)C(=O)N(C(CO)Cc1ccccc1)C5=O] |
| A1-33 | 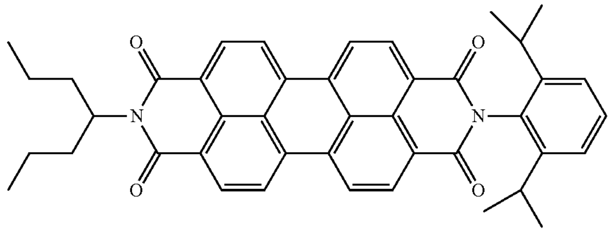 [SMILES: CCCC(CCC)N1C(=O)c2ccc3c4ccc5c6c(ccc(c7ccc(c2c37)C1=O)c64)C(=O)N(c1c(C(C)C)cccc1C(C)C)C5=O] |
| A1-34 | 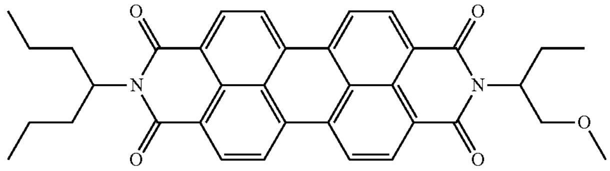 |
| A1-35 | 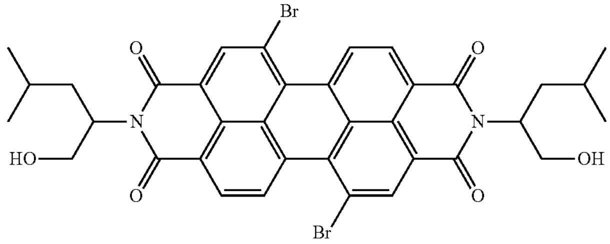 [SMILES: CC(C)CC(CO)N1C(=O)c2ccc3c4c(Br)cc5c6c(ccc(c7c(Br)cc(c2c37)C1=O)c64)C(=O)N(C(CO)CC(C)C)C5=O] |
| A1-36 | 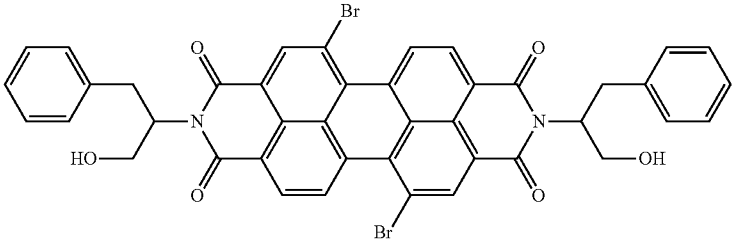 [SMILES: O=C1c2ccc3c4c(Br)cc5c6c(ccc(c7c(Br)cc(c2c37)C(=O)N1C(CO)Cc1ccccc1)c64)C(=O)N(C(CO)Cc1ccccc1)C5=O] |
| A1-37 | 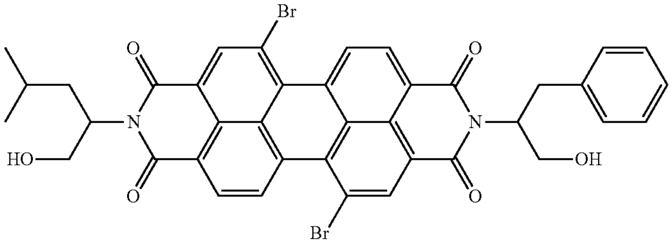 [SMILES: CC(C)CC(CO)N1C(=O)c2ccc3c4c(Br)cc5c6c(ccc(c7c(Br)cc(c2c37)C1=O)c64)C(=O)N(C(CO)Cc1ccccc1)C5=O] |

TABLE 1-continued
| Exemplified Compound | Structure |
|---|---|
| A1-38 | 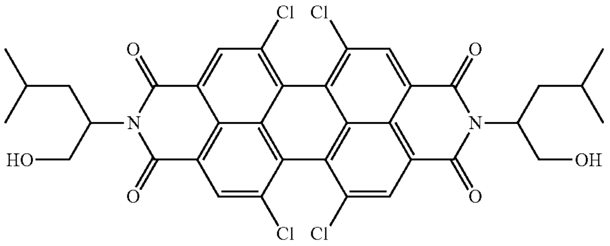 [SMILES: CC(C)CC(CO)N1C(=O)c2cc(Cl)c3c4c(Cl)cc5c6c(cc(Cl)c(c7c(Cl)cc(c2c37)C1=O)c64)C(=O)N(C(CO)CC(C)C)C5=O] |
| A1-39 | 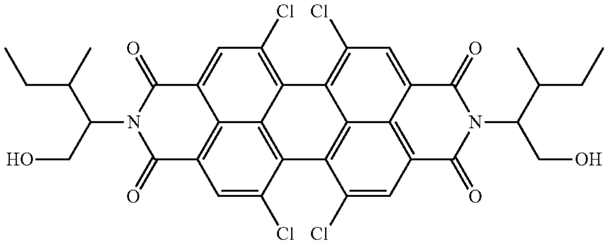 [SMILES: CCC(C)C(CO)N1C(=O)c2cc(Cl)c3c4c(Cl)cc5c6c(cc(Cl)c(c7c(Cl)cc(c2c37)C1=O)c64)C(=O)N(C(CO)C(C)CC)C5=O] |
| A1-40 | 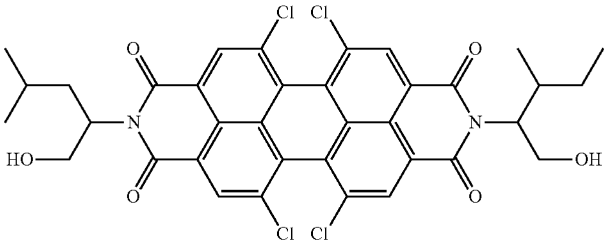 [SMILES: CCC(C)C(CO)N1C(=O)c2cc(Cl)c3c4c(Cl)cc5c6c(cc(Cl)c(c7c(Cl)cc(c2c37)C1=O)c64)C(=O)N(C(CO)CC(C)C)C5=O] |
| A2-1 | 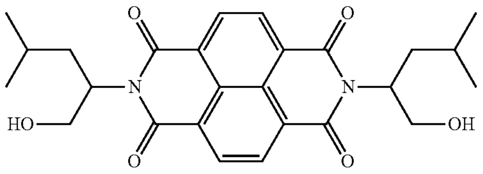 [SMILES: CC(C)CC(CO)N1C(=O)c2ccc3c4c(ccc(c24)C1=O)C(=O)N(C(CO)CC(C)C)C3=O] |
| A2-2 | 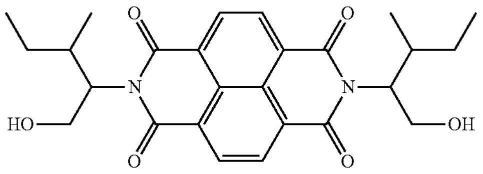 [SMILES: CCC(C)C(CO)N1C(=O)c2ccc3c4c(ccc(c24)C1=O)C(=O)N(C(CO)C(C)CC)C3=O] |
| A2-3 | 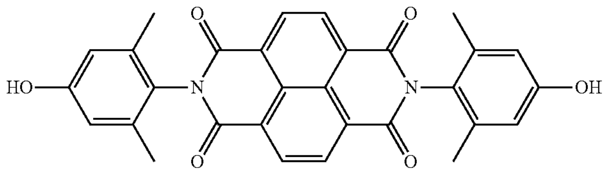 [SMILES: Cc1cc(O)cc(C)c1N1C(=O)c2ccc3c4c(ccc(c24)C1=O)C(=O)N(c1c(C)cc(O)cc1C)C3=O] |
| A2-4 | 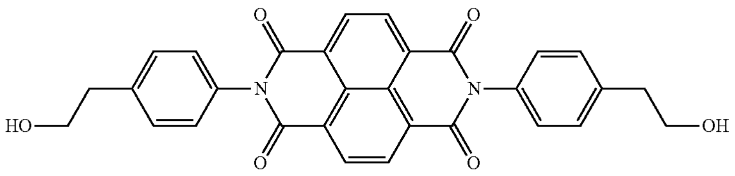 [SMILES: O=C1c2ccc3c4c(ccc(c24)C(=O)N1c1ccc(CCO)cc1)C(=O)N(c1ccc(CCO)cc1)C3=O] |

TABLE 1-continued
| Exemplified Compound | Structure |
|---|---|
| A2-5 | 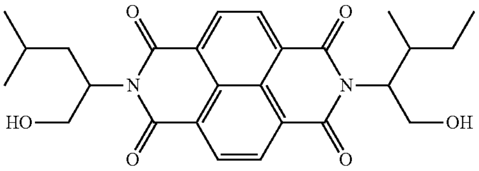 [SMILES: CCC(C)C(CO)N1C(=O)c2ccc3c4c(ccc(c24)C1=O)C(=O)N(C(CO)CC(C)C)C3=O] |
| A2-6 | 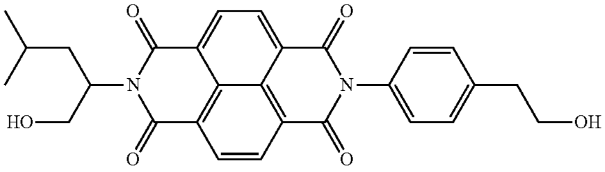 [SMILES: CC(C)CC(CO)N1C(=O)c2ccc3c4c(ccc(c24)C1=O)C(=O)N(c1ccc(CCO)cc1)C3=O] |
| A2-7 | 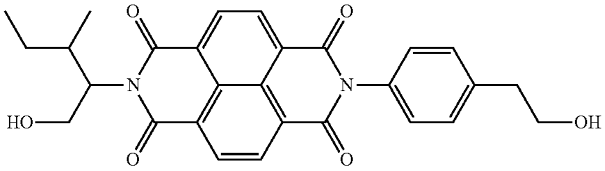 [SMILES: CCC(C)C(CO)N1C(=O)c2ccc3c4c(ccc(c24)C1=O)C(=O)N(c1ccc(CCO)cc1)C3=O] |
| A2-8 | 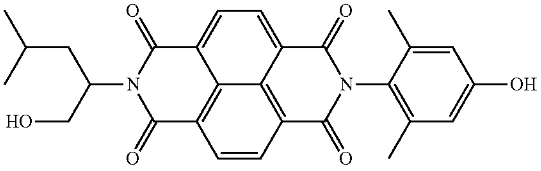 [SMILES: Cc1cc(O)cc(C)c1N1C(=O)c2ccc3c4c(ccc(c24)C1=O)C(=O)N(C(CO)CC(C)C)C3=O] |
| A2-9 | 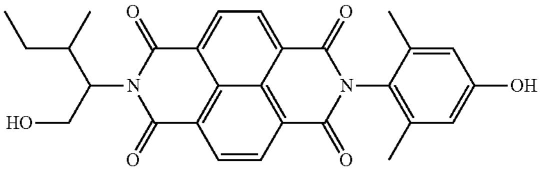 [SMILES: CCC(C)C(CO)N1C(=O)c2ccc3c4c(ccc(c24)C1=O)C(=O)N(c1c(C)cc(O)cc1C)C3=O] |
| A2-10 | 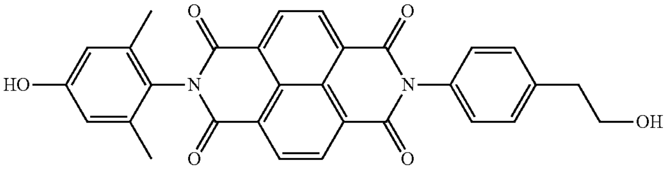 [SMILES: Cc1cc(O)cc(C)c1N1C(=O)c2ccc3c4c(ccc(c24)C1=O)C(=O)N(c1ccc(CCO)cc1)C3=O] |
| A3-1 | 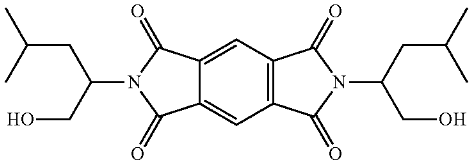 [SMILES: CC(C)CC(CO)n1c(=O)c2cc3c(=O)n(C(CO)CC(C)C)c(=O)c3cc2c1=O] |
| A3-2 | 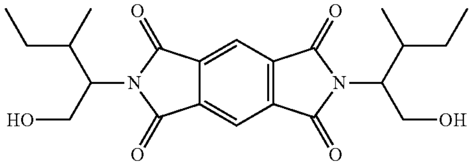 [SMILES: CCC(C)C(CO)n1c(=O)c2cc3c(=O)n(C(CO)C(C)CC)c(=O)c3cc2c1=O] |

TABLE 1-continued
| Exemplified Compound | Structure |
| --- | --- |
| A3-3 | 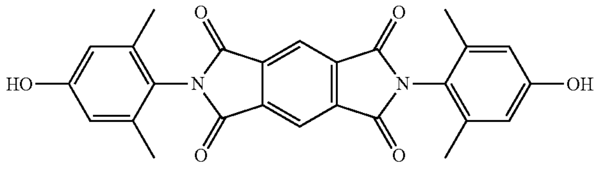 [SMILES: Cc1cc(O)cc(C)c1-n1c(=O)c2cc3c(=O)n(-c4c(C)cc(O)cc4C)c(=O)c3cc2c1=O] |
| A3-4 | 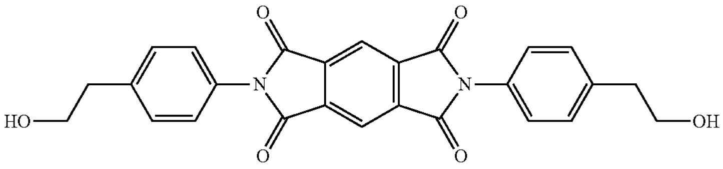 [SMILES: O=c1c2cc3c(=O)n(-c4ccc(CCO)cc4)c(=O)c3cc2c(=O)n1-c1ccc(CCO)cc1] |
| A3-5 | 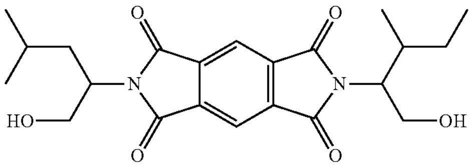 [SMILES: CCC(C)C(CO)n1c(=O)c2cc3c(=O)n(C(CO)CC(C)C)c(=O)c3cc2c1=O] |
| A3-6 | 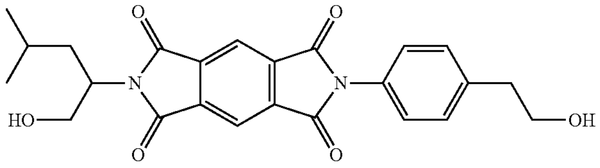 [SMILES: CC(C)CC(CO)n1c(=O)c2cc3c(=O)n(-c4ccc(CCO)cc4)c(=O)c3cc2c1=O] |
| A3-7 | 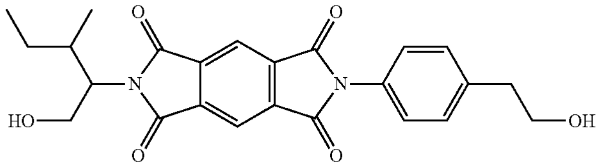 [SMILES: CCC(C)C(CO)n1c(=O)c2cc3c(=O)n(-c4ccc(CCO)cc4)c(=O)c3cc2c1=O] |
| A3-8 | 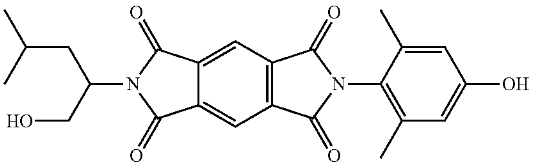 [SMILES: Cc1cc(O)cc(C)c1-n1c(=O)c2cc3c(=O)n(C(CO)CC(C)C)c(=O)c3cc2c1=O] |
| A3-9 | 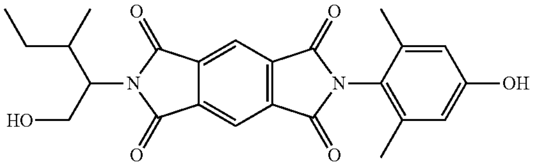 [SMILES: CCC(C)C(CO)n1c(=O)c2cc3c(=O)n(-c4c(C)cc(O)cc4C)c(=O)c3cc2c1=O] |
| A3-10 | 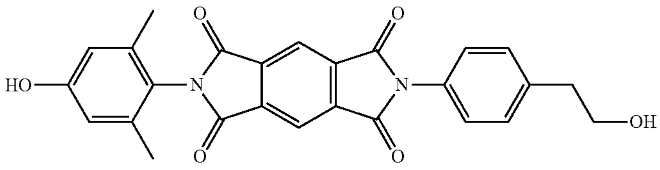 [SMILES: Cc1cc(O)cc(C)c1-n1c(=O)c2cc3c(=O)n(-c4ccc(CCO)cc4)c(=O)c3cc2c1=O] |

TABLE 1-continued
| Exemplified Compound | Structure |
| --- | --- |
| A1-41 | 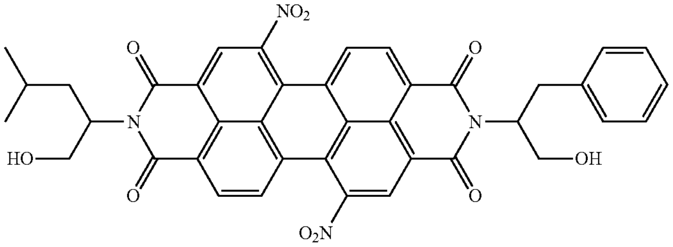 [SMILES: CC(C)CC(CO)N1C(=O)c2ccc3c4c([N+](=O)[O-])cc5c6c(ccc(c7c([N+](=O)[O-])cc(c2c37)C1=O)c64)C(=O)N(C(CO)Cc1ccccc1)C5=O] |
| A1-42 | 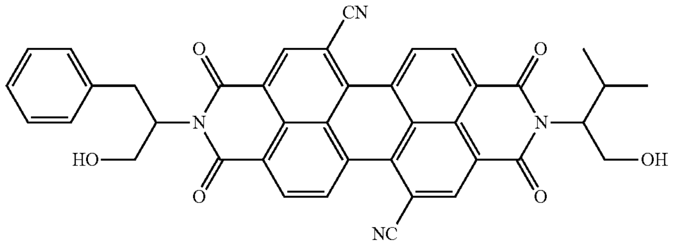 [SMILES: CC(C)C(CO)N1C(=O)c2ccc3c4c(C#N)cc5c6c(ccc(c7c(C#N)cc(c2c37)C1=O)c64)C(=O)N(C(CO)Cc1ccccc1)C5=O] |
| A1-43 | 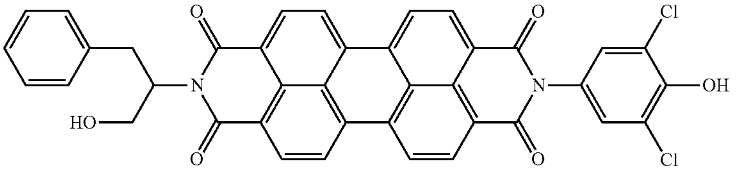 [SMILES: O=C1c2ccc3c4ccc5c6c(ccc(c7ccc(c2c37)C(=O)N1c1cc(Cl)c(O)c(Cl)c1)c64)C(=O)N(C(CO)Cc1ccccc1)C5=O] |
| A1-44 | 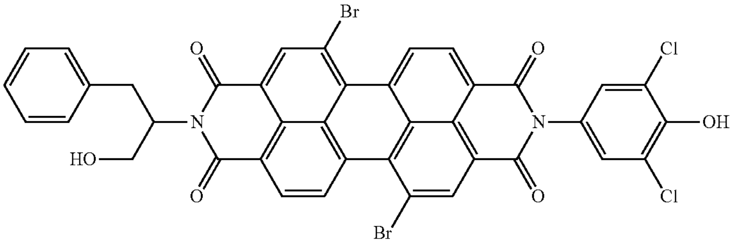 [SMILES: O=C1c2ccc3c4c(Br)cc5c6c(ccc(c7c(Br)cc(c2c37)C(=O)N1c1cc(Cl)c(O)c(Cl)c1)c64)C(=O)N(C(CO)Cc1ccccc1)C5=O] |
| A1-45 | 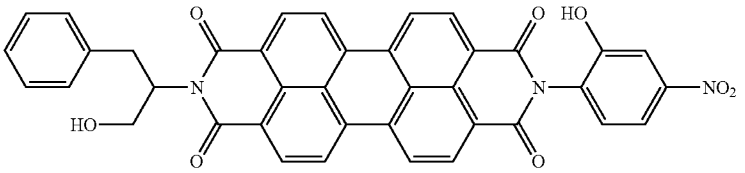 [SMILES: O=C1c2ccc3c4ccc5c6c(ccc(c7ccc(c2c37)C(=O)N1c1ccc([N+](=O)[O-])cc1O)c64)C(=O)N(C(CO)Cc1ccccc1)C5=O] |
| A1-46 | 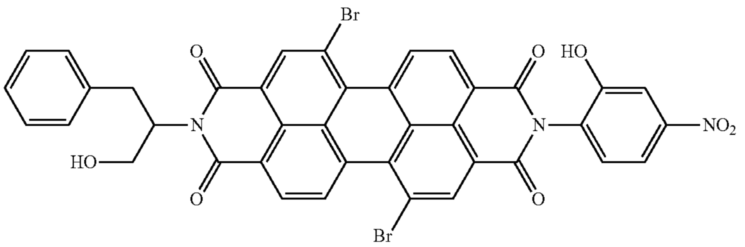 [SMILES: O=C1c2ccc3c4c(Br)cc5c6c(ccc(c7c(Br)cc(c2c37)C(=O)N1c1ccc([N+](=O)[O-])cc1O)c64)C(=O)N(C(CO)Cc1ccccc1)C5=O] |
| A1-47 | 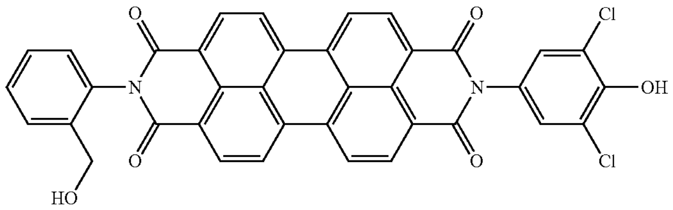 [SMILES: O=C1c2ccc3c4ccc5c6c(ccc(c7ccc(c2c37)C(=O)N1c1cc(Cl)c(O)c(Cl)c1)c64)C(=O)N(c1ccccc1CO)C5=O] |

TABLE 1-continued
| Exemplified Compound | Structure |
|---|---|
| A1-48 | 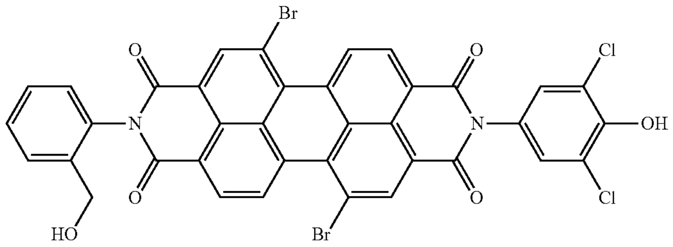 [SMILES: O=C1c2ccc3c4c(Br)cc5c6c(ccc(c7c(Br)cc(c2c37)C(=O)N1c1cc(Cl)c(O)c(Cl)c1)c64)C(=O)N(c1ccccc1CO)C5=O] |
| A1-49 | 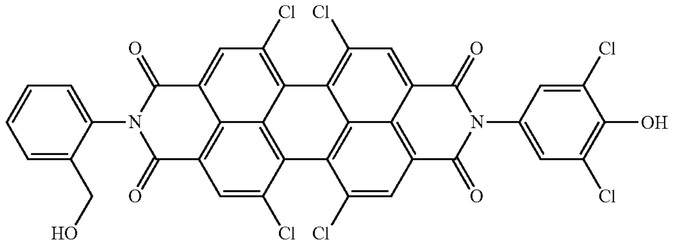 [SMILES: O=C1c2cc(Cl)c3c4c(Cl)cc5c6c(cc(Cl)c(c7c(Cl)cc(c2c37)C(=O)N1c1cc(Cl)c(O)c(Cl)c1)c64)C(=O)N(c1ccccc1CO)C5=O] |
| A1-50 | 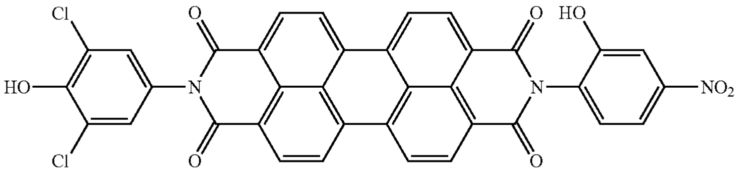 [SMILES: O=C1c2ccc3c4ccc5c6c(ccc(c7ccc(c2c37)C(=O)N1c1cc(Cl)c(O)c(Cl)c1)c64)C(=O)N(c1ccc([N+](=O)[O-])cc1O)C5=O] |
| A2-11 | 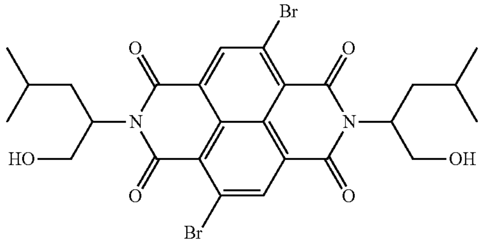 [SMILES: CC(C)CC(CO)N1C(=O)c2cc(Br)c3c4c(cc(Br)c(c24)C1=O)C(=O)N(C(CO)CC(C)C)C3=O] |
| A2-12 | 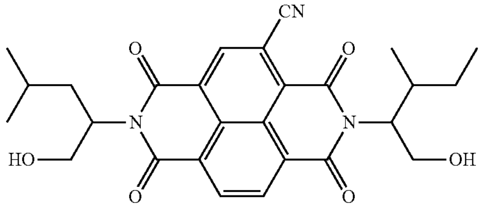 [SMILES: CCC(C)C(CO)N1C(=O)c2ccc3c4c(cc(C#N)c(c24)C1=O)C(=O)N(C(CO)CC(C)C)C3=O] |
| A2-13 | 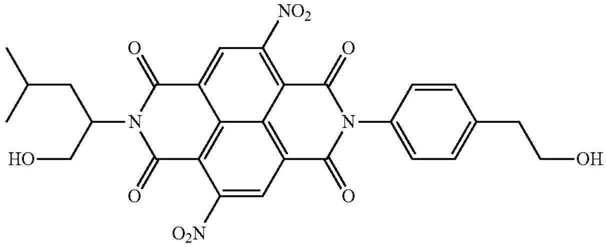 [SMILES: CC(C)CC(CO)N1C(=O)c2cc([N+](=O)[O-])c3c4c(cc([N+](=O)[O-])c(c24)C1=O)C(=O)N(c1ccc(CCO)cc1)C3=O] |

TABLE 1-continued
| Exemplified Compound | Structure |
| --- | --- |
| A2-14 | 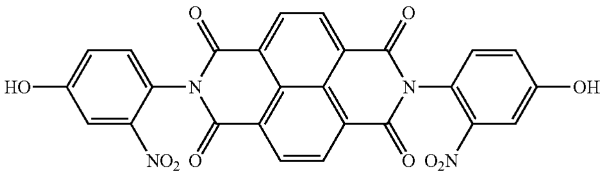 [SMILES: O=C1c2ccc3c4c(ccc(c24)C(=O)N1c1ccc(O)cc1[N+](=O)[O-])C(=O)N(c1ccc(O)cc1[N+](=O)[O-])C3=O] |
| A2-15 | 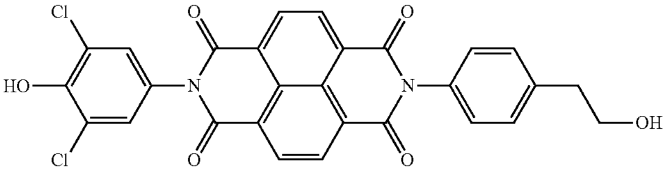 [SMILES: O=C1c2ccc3c4c(ccc(c24)C(=O)N1c1ccc(CCO)cc1)C(=O)N(c1cc(Cl)c(O)c(Cl)c1)C3=O] |
| A3-11 | 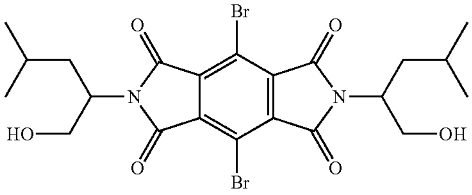 [SMILES: CC(C)CC(CO)n1c(=O)c2c(Br)c3c(=O)n(C(CO)CC(C)C)c(=O)c3c(Br)c2c1=O] |
| A3-12 | 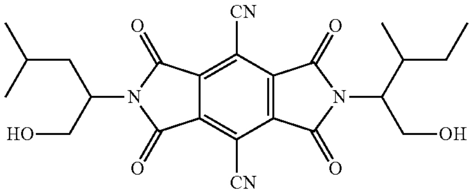 [SMILES: CCC(C)C(CO)n1c(=O)c2c(C#N)c3c(=O)n(C(CO)CC(C)C)c(=O)c3c(C#N)c2c1=O] |
| A3-13 | 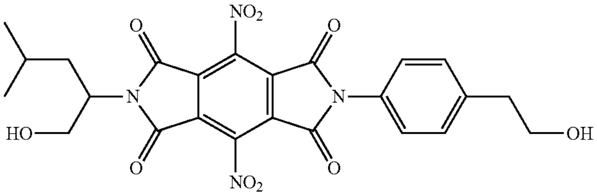 [SMILES: CC(C)CC(CO)n1c(=O)c2c([N+](=O)[O-])c3c(=O)n(-c4ccc(CCO)cc4)c(=O)c3c([N+](=O)[O-])c2c1=O] |
| A3-14 | 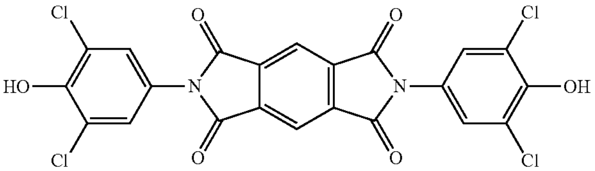 [SMILES: O=c1c2cc3c(=O)n(-c4cc(Cl)c(O)c(Cl)c4)c(=O)c3cc2c(=O)n1-c1cc(Cl)c(O)c(Cl)c1] |
| A3-15 | 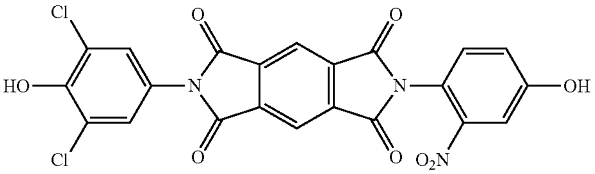 [SMILES: O=c1c2cc3c(=O)n(-c4ccc(O)cc4[N+](=O)[O-])c(=O)c3cc2c(=O)n1-c1cc(Cl)c(O)c(Cl)c1] |

TABLE 2

| | Charge transporting substance 1 | | Charge transporting substance 2 | | Charge transporting substance 3 | | Initial potential | Potential fluctuation | |
|---|---|---|---|---|---|---|---|---|---|
| | | | | | | | | After output on 20,000 | After output on 40,000 |
| Example | Kind | Amount | Kind | Amount | Kind | Amount | (V) | sheets | sheets |
| 1 | A1-1 | 3.00 | A1-18 | 3.00 | — | — | 95 | 10 | 21 |
| 2 | A1-2 | 2.00 | A1-19 | 4.00 | — | — | 96 | 12 | 23 |
| 3 | A1-1 | 1.50 | A1-20 | 4.50 | — | — | 97 | 11 | 22 |
| 4 | A1-2 | 2.00 | A1-25 | 4.00 | — | — | 98 | 15 | 24 |
| 5 | A1-1 | 1.80 | A1-26 | 3.20 | — | — | 99 | 16 | 26 |
| 6 | A1-5 | 1.40 | A1-27 | 4.60 | — | — | 97 | 14 | 25 |
| 7 | A1-2 | 2.00 | A1-30 | 4.00 | — | — | 104 | 15 | 24 |
| 8 | A1-5 | 1.80 | A1-23 | 3.20 | — | — | 105 | 16 | 26 |
| 9 | A1-6 | 1.40 | A1-24 | 4.60 | — | — | 101 | 14 | 24 |
| 10 | A1-1 | 4.80 | A1-18 | 1.20 | — | — | 96 | 11 | 20 |
| 11 | A1-1 | 1.20 | A1-18 | 4.80 | — | — | 94 | 9 | 19 |
| 12 | A2-1 | 3.00 | A2-5 | 3.00 | — | — | 113 | 16 | 25 |
| 13 | A2-1 | 3.00 | A2-6 | 3.00 | — | — | 111 | 15 | 26 |
| 14 | A3-1 | 3.00 | A3-5 | 3.00 | — | — | 123 | 17 | 29 |
| 15 | A3-1 | 3.00 | A3-6 | 3.00 | — | — | 124 | 16 | 28 |
| 16 | A1-1 | 1.50 | A1-18 | 3.00 | A1-5 | 1.50 | 97 | 10 | 15 |
| 17 | A1-1 | 1.20 | A1-19 | 3.60 | A1-2 | 1.20 | 99 | 9 | 15 |
| 18 | A1-1 | 2.00 | A1-20 | 2.00 | A1-3 | 2.00 | 96 | 10 | 14 |
| 19 | A1-4 | 2.50 | A1-21 | 1.00 | A1-5 | 2.50 | 94 | 11 | 16 |
| 20 | A1-8 | 3.00 | A1-28 | 1.00 | A1-9 | 2.00 | 95 | 9 | 14 |
| 21 | A1-2 | 1.50 | A1-25 | 3.00 | A1-12 | 1.50 | 100 | 9 | 20 |
| 22 | A1-1 | 1.20 | A1-26 | 3.60 | A1-13 | 1.20 | 102 | 10 | 22 |
| 23 | A1-1 | 1.50 | A1-22 | 3.00 | A1-6 | 1.50 | 106 | 10 | 21 |
| 24 | A1-6 | 1.10 | A1-24 | 3.80 | A1-7 | 1.10 | 104 | 9 | 19 |
| 25 | A1-1 | 1.00 | A1-18 | 4.00 | A1-5 | 1.00 | 95 | 8 | 14 |
| 26 | A1-1 | 4.00 | A1-18 | 1.00 | A1-5 | 1.00 | 94 | 9 | 16 |
| 27 | A2-1 | 1.50 | A2-5 | 3.00 | A2-2 | 1.50 | 110 | 14 | 24 |
| 28 | A2-1 | 1.50 | A2-6 | 3.00 | A2-4 | 1.50 | 111 | 16 | 26 |
| 29 | A2-3 | 1.00 | A2-10 | 4.00 | A2-4 | 1.00 | 109 | 14 | 26 |
| 30 | A3-1 | 1.50 | A3-5 | 3.00 | A3-2 | 1.50 | 119 | 16 | 30 |
| 31 | A3-1 | 1.50 | A3-6 | 3.00 | A3-4 | 1.50 | 121 | 15 | 29 |
| 32 | A1-1 | 1.50 | A1-18 | 3.00 | A1-5 | 1.50 | 105 | 12 | 23 |
| 33 | A1-15 | 3.00 | A1-33 | 3.00 | — | — | 94 | 11 | 20 |
| 34 | A1-15 | 2.00 | A1-34 | 4.00 | — | — | 96 | 10 | 22 |
| 35 | A1-5 | 3.00 | A1-31 | 3.00 | — | — | 101 | 14 | 24 |
| 36 | A1-5 | 2.00 | A1-32 | 4.00 | — | — | 102 | 15 | 25 |
| 37 | A1-15 | 4.80 | A1-33 | 1.20 | — | — | 96 | 11 | 21 |
| 38 | A1-15 | 1.20 | A1-33 | 4.80 | — | — | 97 | 10 | 22 |
| 39 | A1-15 | 1.50 | A1-33 | 3.00 | A1-16 | 1.50 | 95 | 12 | 21 |
| 40 | A1-15 | 1.50 | A1-34 | 3.00 | A1-17 | 1.50 | 96 | 11 | 23 |
| 41 | A1-5 | 1.50 | A1-31 | 3.00 | A1-15 | 1.50 | 99 | 16 | 26 |
| 42 | A1-5 | 1.50 | A1-32 | 3.00 | A1-17 | 1.50 | 98 | 15 | 26 |

Comparative Example 1

An electrophotographic photosensitive member was produced in the same manner as in Example 1 except that a coating liquid for an undercoat layer was prepared as described below and used. The results are shown in Table 3.

<Coating Liquid for Undercoat Layer>

3.10 Parts of Exemplified Compound (A1-1) shown in Table 1-1, 0.36 part of a polyolefin resin (product name: UC-3920, manufactured by Toagosei Co., Ltd.), and 6.41 parts of a blocked isocyanate compound (product name: SBB-70P, manufactured by Asahi Kasei Corporation) were dissolved in a mixed solvent containing 50 parts of 1-methoxy-2-propanol and 50 parts of tetrahydrofuran to prepare a coating liquid for an undercoat layer.

Comparative Example 2

An electrophotographic photosensitive member was produced in the same manner as in Comparative Example 1 except that the electroconductive layer was formed between the support and the undercoat layer in the same manner as in Example 32, and the photosensitive member was similarly evaluated. The results are shown in Table 3.

TABLE 3

| Comparative Example | Charge transporting substance 1 Kind | Charge transporting substance 1 Amount | Charge transporting substance 2 Kind | Charge transporting substance 2 Amount | Charge transporting substance 3 Kind | Charge transporting substance 3 Amount | Initial potential (V) | Potential fluctuation After output on 20,000 sheets | Potential fluctuation After output on 40,000 sheets |
|---|---|---|---|---|---|---|---|---|---|
| 1 | A1-1 | 3.10 | — | — | — | — | 105 | 22 | 40 |
| 2 | A1-1 | 3.10 | — | — | — | — | 115 | 25 | 45 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-096646, filed Jun. 15, 2022, which is hereby incorporated by reference herein in its entirety.

What is claimed is:

1. An electrophotographic photosensitive member comprising:

a support;

an undercoat layer formed on the support; and a photosensitive layer formed on the undercoat layer, wherein the undercoat layer comprises a polymer of a composition comprising:

a compound represented by the following formula (1);

a compound represented by the following formula (2); and a compound represented by the following formula (5), and a crosslinking agent having a group capable of being bonded to one of a hydroxy group or a carboxyl group:

(1)

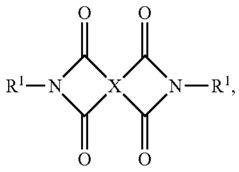

(2)

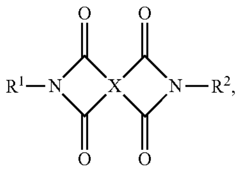

(5)

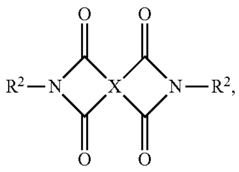

in the formulae (1), (2), and (5), $R^1$ and $R^2$ are not identical to each other, and are each represented by the following formula (10), and in the formulae (1), (2), and (5), each X is identical, and each X represents a tetravalent structures represented by the following formula (X1):

$$—(R^a)_m—(R^b)_n—R^c \quad (10)$$

in the formula (10), $R^a$ represents a branched or linear alkylene group having 1 or more and 10 or less carbon atoms that optionally has a substituent, or a phenylene group that optionally has a substituent, in the formula (10), $R^b$ represents —O—, —S—, or a group represented by the following formula (11):

(11)

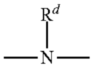

in the formula (11), $R^d$ represents a hydrogen atom, or a branched or linear alkyl group having 1 or more and 4 or less carbon atoms, and in the formula (10), $R^c$ represents a hydrogen atom, a branched or linear alkyl group having 1 or more and 10 or less carbon atoms that optionally has a substituent, an aryl group having 6 or more and 14 or less carbon atoms that optionally has a substituent, or a branched or linear arylalkyl group having 7 or more and 18 or less carbon atoms that optionally has a substituent, in a case that the alkylene group or the alkyl group has a substituent, the substituent is a hydroxy group, a carboxyl group, an amino group, a thiol group, an alkoxy group having 1 or more and 3 or less carbon atoms, or an alkoxycarbonyl group having 2 or more and 4 or less carbon atoms, in a case that the phenylene group, the aryl group, or the arylalkyl group has a substituent, the substituent is an alkyl group having 1 or more and 3 or less carbon atoms, a hydroxy group, a hydroxyalkyl group having 1 or more and 3 or less carbon atoms, a carboxyl group, an amino group, a thiol group, an alkoxy group having 1 or more and 3 or less carbon atoms, an alkoxycarbonyl group having 2 or more and 4 or less carbon atoms, a halogen atom, a cyano group, or a nitro group, m represents 0 or 1, and n represents 0 or l, and $R^1$ contains a hydroxy group or a carboxyl group, and $R^2$ contains a hydroxy group or a carboxyl group:

(X1)

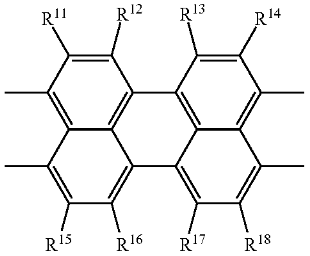

in the formula (X1), $R^{11}$ to $R^{18}$ each independently represent a hydrogen atom, a halogen atom, a cyano group, or a nitro group.

2. The electrophotographic photosensitive member according to claim 1, wherein in each of the formulae (1), (2), and (5), at least one selected from the group consisting of $R^1$ and $R^2$ represents a group represented by the following formula (7):

(7)

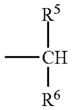

in the formula (7), $R^5$ and $R^6$ each independently represent a group selected from the group consisting of: a branched or linear alkyl group having 1 or more and 7 or less carbon atoms that optionally has a substituent; a benzyl group; an alkoxycarbonyl group having 2 or more and 4 or less carbon atoms; and a phenyl group, and in a case that the alkyl group has a substituent, the substituent is a group selected from the group consisting of: an alkoxycarbonyl group having 2 or more and 4 or less carbon atoms; a phenyl group; a phenol group; a hydroxy group; a thiol group; an amino group; and a carboxyl group.

3. The electrophotographic photosensitive member according to claim 1, wherein in the composition, a mass ratio of the compound represented by the formula (1) to the compound represented by the formula (2) is 0.25 or more and 4 or less.

4. A process cartridge comprising:

the electrophotographic photosensitive member of claim 1; and at least one unit selected from the group consisting of:

a charging unit;

a developing unit; and a cleaning unit, the process cartridge integrally supporting the electrophotographic photosensitive member and the at least one unit, and being detachably attachable to a main body of an electrophotographic apparatus.

5. An electrophotographic apparatus comprising:

the electrophotographic photosensitive member of claim 1;

a charging unit;

an exposing unit;

a developing unit; and a transferring unit.

6. A method of producing an electrophotographic photosensitive member comprising:

a support, an undercoat layer formed on the support, and a photosensitive layer formed on the undercoat layer, the method comprising:

forming a coating film of a coating liquid for an undercoat layer comprising:

a compound represented by the formula (1), a compound represented by the formula (2), and a crosslinking agent having a group capable of being bonded to one of a hydroxy group or a carboxyl group; and polymerizing the coating film to form the undercoat layer:

(1)

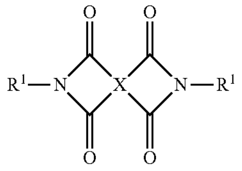

(2)

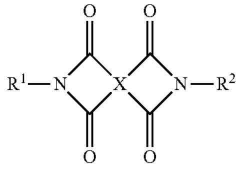

(5)

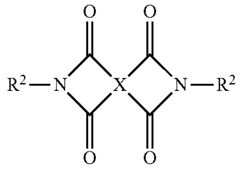

in the formulae (1), (2), and (5), $R^1$ and $R^2$ are not identical to each other, and are each represented by the following formula (10), and in the formulae (1), (2), and (5), each X is identical, and each X represents a tetravalent structures represented by the following formula (X1):

$$—(R^a)_m—(R^b)_n—R^c \quad (10)$$

in the formula (10), $R^a$ represents a branched or linear alkylene group having 1 or more and 10 or less carbon atoms that optionally has a substituent, or a phenylene group that optionally has a substituent, in the formula (10), $R^b$ represents —O—, —S—, or a group represented by the following formula (11):

(11)

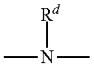

in the formula (11), $R^d$ represents a hydrogen atom, or a branched or linear alkyl group having 1 or more and 4 or less carbon atoms, and in the formula (10), $R^c$ represents a hydrogen atom, a branched or linear alkyl group having 1 or more and 10 or less carbon atoms that may have a substituent, an aryl group having 6 or more and 14 or less carbon atoms that optionally has a substituent, or a branched or linear arylalkyl group having 7 or more and 18 or less carbon atoms that optionally has a substituent, in a case that the alkylene group or the alkyl group has a substituent, the substituent is a hydroxy group, a carboxyl group, an amino group, a thiol group, an alkoxy group having 1 or more and 3 or less carbon atoms, or an alkoxycarbonyl group having 2 or more and 4 or less carbon atoms, in a case that the phenylene group, the aryl group, or the arylalkyl group has a substituent, the substituent is an alkyl group having 1 or more and 3 or less carbon atoms, a hydroxy group, a hydroxyalkyl group having 1 or more and 3 or less carbon atoms, a carboxyl group, an amino group, a thiol group, an alkoxy group having 1 or more and 3 or less carbon atoms, an alkoxycarbonyl group having 2 or more and 4 or less carbon atoms, a halogen atom, a cyano group, or a nitro group, m represents 0 or 1, and n represents 0 or 1, and $R^1$ contains a hydroxy group or a carboxyl group, and $R^2$ contains a hydroxy group or a carboxyl group:

(X1)

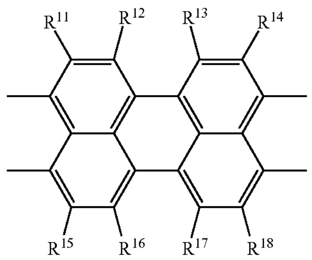

in the formulae (X1), $R^{11}$ to $R^{18}$ each independently represent a hydrogen atom, a halogen atom, a cyano group, or a nitro group.

* * * * *